(12) United States Patent
Tripathi et al.

(10) Patent No.: US 12,020,009 B2
(45) Date of Patent: Jun. 25, 2024

(54) SOFTWARE APPLICATION DEPLOYMENT

(71) Applicant: Kyndryl, Inc., New York, NY (US)

(72) Inventors: Dinesh Tripathi, Rewa (IN); Sarin Kumar Thayyilsubramanian, Bangalore (IN); John Kurian, Bangalore (IN); Ramesh S Palakodeti, Cumming, GA (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/388,290

(22) Filed: Jul. 29, 2021

(65) Prior Publication Data

US 2023/0048653 A1 Feb. 16, 2023

(51) Int. Cl.
*G06F 8/60* (2018.01)
*G06F 8/41* (2018.01)

(52) U.S. Cl.
CPC ............... *G06F 8/60* (2013.01); *G06F 8/427* (2013.01); *G06F 8/436* (2013.01)

(58) Field of Classification Search
CPC ............ G06F 8/60; G06F 8/427; G06F 8/436
See application file for complete search history.

(56) References Cited

U.S. PATENT DOCUMENTS 9,959,135 B2 5/2018 Ghosh et al.
9,986,031 B2 5/2018 Jain et al.
10,212,051 B2 2/2019 Maes (Continued)

FOREIGN PATENT DOCUMENTS

WO WO-2015081791 A1 * 6/2015 ............ G06F 21/56

OTHER PUBLICATIONS

"JavaCC—The most popular parser generator for use with Java applications", JavaCC Community. Retrieved on Apr. 13, 2021 from the Internet URL: <https://javacc.github.io/javacc/>, 9 pgs.

(Continued)

*Primary Examiner* — Hanh Thi-Minh Bui
(74) *Attorney, Agent, or Firm* — Dan Housley; Andrew M. Calderon; Calderon Safran & Wright P.C.

(57) ABSTRACT

Methods, computer program products, and systems can include obtaining a first computing environment specific application deployment software code instance associated to a first computing environment, the first computing environment specific application deployment software code instance for deployment of a certain application on the first computing environment; parsing the first computing environment specific application deployment software code instance, wherein the parsing includes determining attributes of the first computing environment specific application deployment software code instance and generating, using the determined attributes of the first computing environment specific application deployment software code instance, a computing environment agnostic semantic tree data structure that expresses a workflow pattern for deployment of the certain application; and composing, with use of the computing environment agnostic semantic tree data structure, a second computing environment specific application deployment software code instance associated to a second computing environment for deployment of the certain application on the second computing environment.

18 Claims, 16 Drawing Sheets

(56) References Cited

U.S. PATENT DOCUMENTS

| | | | |
|---|---|---|---|
| 10,389,586 B2 | 8/2019 | Hockett et al. | |
| 10,884,732 B1 | 1/2021 | Zolotow et al. | |
| 2016/0077818 A1* | 3/2016 | Nos ................. | H04L 41/0293 |
| | | | 717/177 |
| 2018/0262559 A1* | 9/2018 | Arya ................. | G06F 16/95 |
| 2018/0357051 A1* | 12/2018 | Puszkiewicz ....... | G06F 9/45512 |
| 2019/0149617 A1* | 5/2019 | Gao .................. | H04L 67/34 |
| | | | 709/223 |
| 2022/0300469 A1* | 9/2022 | Agrawal ............ | G06F 16/25 |
| 2022/0317979 A1* | 10/2022 | Araujo Soares .... | G06F 16/9024 |

OTHER PUBLICATIONS

Jamshidi, et al., "Pattern-based Multi-Cloud Architecture Migration", Software Practice and Experience, Aug. 2016, 26 pgs.

Mell, Peter, et al., "The NIST Definition of Cloud Computing", NIST Special Publication 800-145, Sep. 2011, Gaithersburg, MD, 7 pgs.

Song, Hui et al; "Model-based fleet deployment of edge computing applications"; Proceedings of the 23rd ACM/IEEE International Conference on Model Driven Engineering Languages and Systems; Oct. 2020; pp. 132-142.

Bhattacharjee, Anirban et al; CloudCAMP: Automating cloud Services Deployment & Management; arXiv: 1904.0218v2 [cs.SE]; Apr. 9, 2019; 12 pages.

International Search Report; International application No. PCT/EP2022/067893; Filing Date Jun. 29, 2022; dated Oct. 19, 2022; 4 pages.

* cited by examiner

SOFTWARE APPLICATION DEPLOYMENT

BACKGROUND

Embodiments herein relate generally to software applications and specifically to deployments of software applications in computing environments.

There are a plurality of public computing environment providers on the market today, each of them offering specific services with service levels, targeting specific use cases, groups of clients, vertical and geographic markets. These public computing providers compete with services of traditional IT service providers which are operated typically in on-premise private computing environments of client owned datacenters. While public providers seem to have advantages over said company-owned datacenters, they are not under direct control of the client companies and there is a substantial risk of failure to provide agreed service levels. Furthermore, public computing environment providers might change their service levels, prices, and service offerings more often than traditional on-premise (owned by the service consumer) information technology providers.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining a first computing environment specific application deployment software code instance associated to a first computing environment, the first computing environment specific application deployment software code instance for deployment of a certain application on the first computing environment; parsing the first computing environment specific application deployment software code instance, wherein the parsing includes determining attributes of the first computing environment specific application deployment software code instance and generating, using the determined attributes of the first computing environment specific application deployment software code instance, a computing environment agnostic semantic tree data structure that expresses a workflow pattern for deployment of the certain application; and composing, with use of the computing environment agnostic semantic tree data structure, a second computing environment specific application deployment software code instance associated to a second computing environment for deployment of the certain application on the second computing environment.

In another aspect, a computer program product can be provided. The computer program product can include a computer readable storage medium readable by one or more processing circuit and storing instructions for execution by one or more processor for performing a method. The method can include, for example: obtaining a first computing environment specific application deployment software code instance associated to a first computing environment, the first computing environment specific application deployment software code instance for deployment of a certain application on the first computing environment; parsing the first computing environment specific application deployment software code instance, wherein the parsing includes determining attributes of the first computing environment specific application deployment software code instance and generating, using the determined attributes of the first computing environment specific application deployment software code instance, a computing environment agnostic semantic tree data structure that expresses a workflow pattern for deployment of the certain application; and composing, with use of the computing environment agnostic semantic tree data structure, a second computing environment specific application deployment software code instance associated to a second computing environment for deployment of the certain application on the second computing environment.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining a first computing environment specific application deployment software code instance associated to a first computing environment, the first computing environment specific application deployment software code instance for deployment of a certain application on the first computing environment; parsing the first computing environment specific application deployment software code instance, wherein the parsing includes determining attributes of the first computing environment specific application deployment software code instance and generating, using the determined attributes of the first computing environment specific application deployment software code instance, a computing environment agnostic semantic tree data structure that expresses a workflow pattern for deployment of the certain application; and composing, with use of the computing environment agnostic semantic tree data structure, a second computing environment specific application deployment software code instance associated to a second computing environment for deployment of the certain application on the second computing environment.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
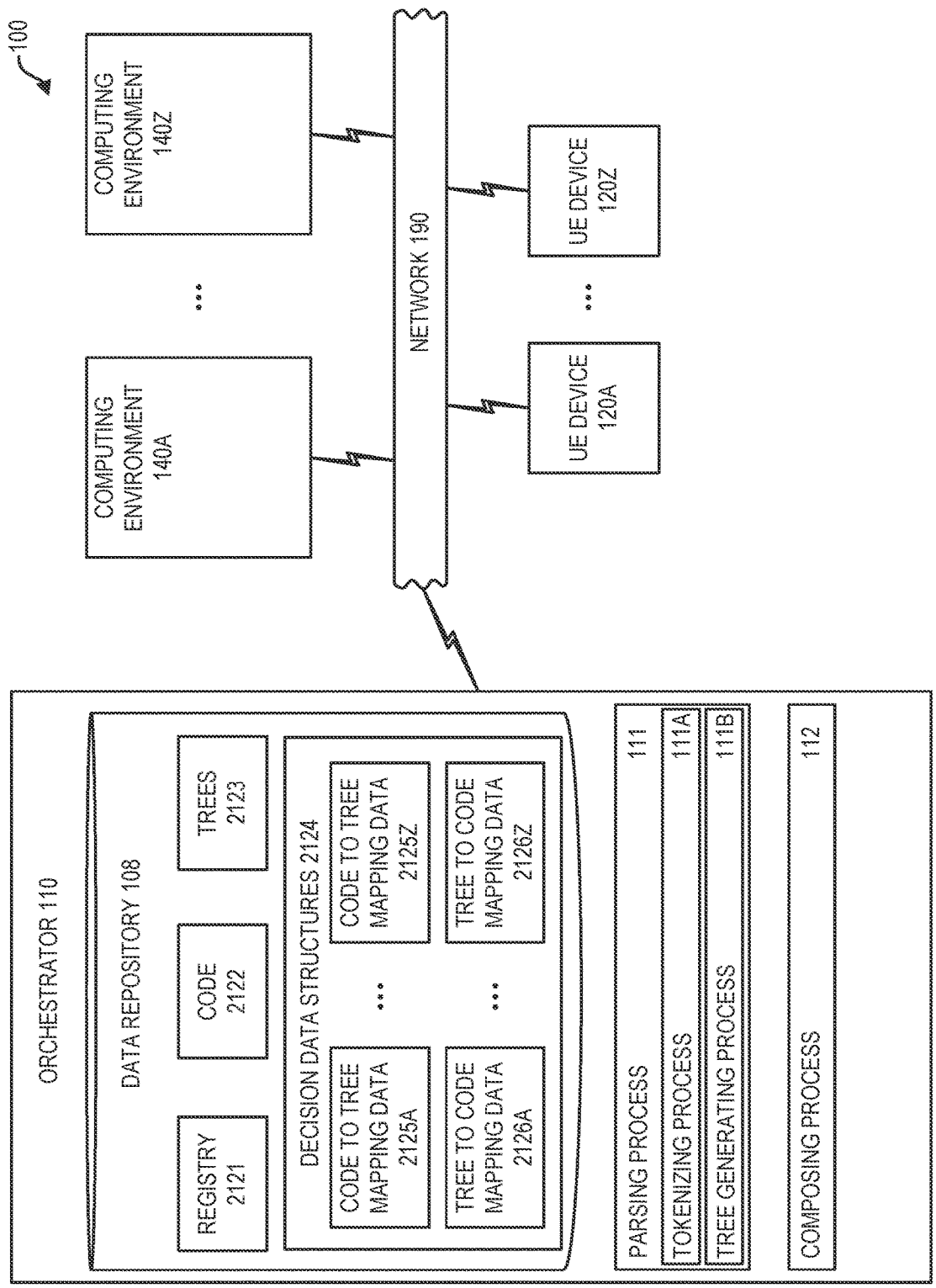
FIG. 1 depicts a system having an orchestrator, a plurality of computing environments, and a plurality of UE devices according to one embodiment.

System 100 for use in deployment of software applications is shown in FIG. 1. System 100 can include orchestrator 110 having associated data repository 108, computing environments 140A-140Z, and user equipment (UE) devices 120A-120Z. Orchestrator 110, computing environments 140A-140Z, and UE devices 120A-120Z can be computing node-based devices and can be in communication with one another via network 190. Network 190 may be a physical network and/or a virtual network. A physical network can, for example, be a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

According to one embodiment, each of orchestrator 110, computing environments 140A-140Z, and UE devices 120A-120Z can be external to one another, e.g., located on different computing nodes, e.g., different physical computing nodes.

According to one embodiment, one or more of orchestrator 110, computing environments 140A-140Z, and UE devices 120A-120Z can be co-located on at least one of orchestrator 110, one of computing environments 140A-140Z, or one of UE devices 120A-120Z.

Embodiments herein recognize that challenges exist with respect to the deployment of common applications across multiple computing environments. Embodiments herein can be operative for parsing a first application deployment software code instance for deployment of a software application on a first computing environment, generating by the parsing a computing environment agnostic semantic tree data structure that expresses a deployment workflow pattern for the software application, and using the computing environment agnostic semantic tree data structure to generate a second application deployment software code instance for deploying the software application on a second computing environment.

Computing environments 140A-140Z of system 100 can be associated to respective computing environment providers. Computing environments of computing environments 140A-140Z can include, e.g., private computing environments and public computing environments which provide multitenancy hosting capabilities. Computing environments of computing environments 140A-140Z can include one or more private computing environment known as, e.g., an internal or enterprise cloud that resides, e.g., on an enterprise's intranet or hosted data center. Alternatively or additionally, computing environments of computing environments 140A-140Z can include one or more shared public computing environment shared by multiple enterprise tenants with use of a multitenancy architecture.

According to one embodiment, where computing environments 140A-140Z include computing environments configured as public cloud multitenancy computing environments, computing environment providers associated to respective computing environments 140A-140Z can be providers known as public cloud service providers, e.g., IBM® CLOUD® cloud services, AMAZON® WEB SERVICES® (AWS®), or MICROSOFT® AZURE® cloud services (IBM® and IBM CLOUD are registered trademarks of International Business Machines Corporation, AMAZON®, AMAZON WEB SERVICES® and AWS® are registered trademarks of Amazon.com, Inc., and MICROSOFT® and AZURE® are registered trademarks of Microsoft Corporation). Embodiments herein can be described with reference to differentiated fictitious private or publicly accessible multitenancy computing environments such as computing environments CEA, CEB, and CEC.

Figure 2:
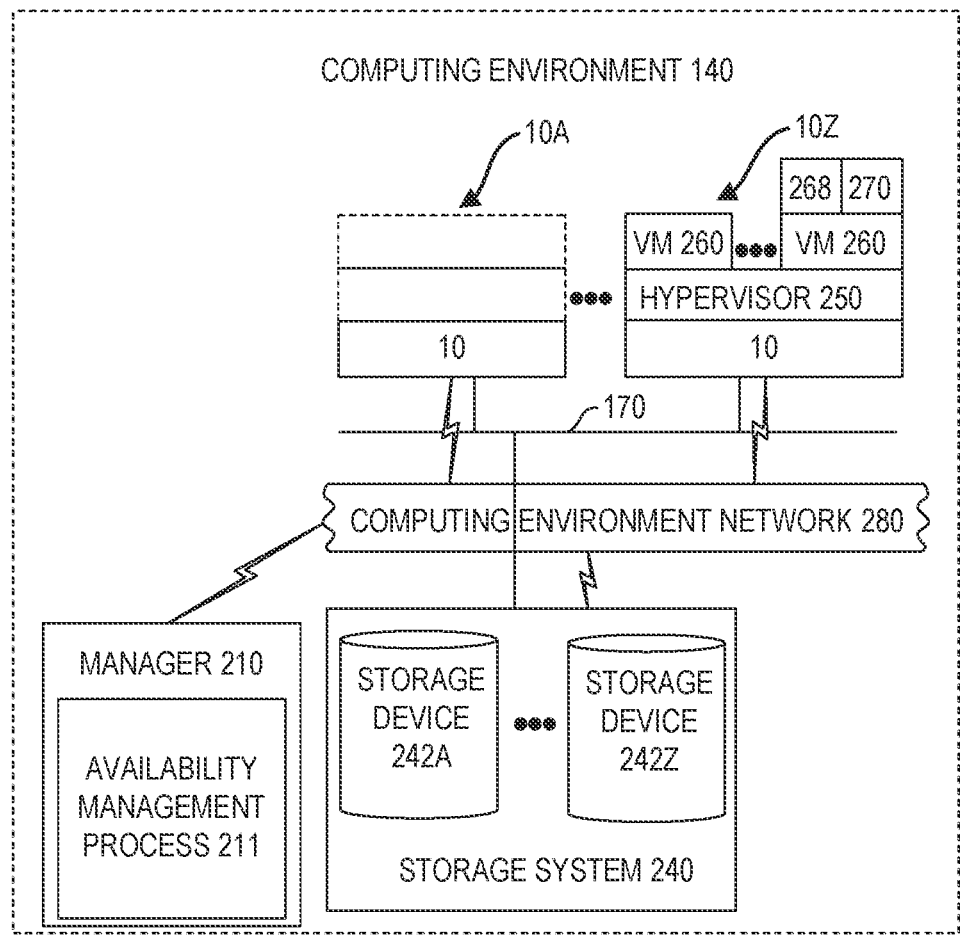
FIG. 2 depicts a computing environment according to one embodiment.

Computing environment 140 as shown in FIG. 2, which can be representative of an exemplary configuration for any one of computing environments 140A-140Z and can include a plurality of computing nodes 10, which can be provided by physical computing nodes. The respective computing nodes 10 can have software mining thereon defining computing node stacks 10A-10Z. Software defining the respective instances of computing node stacks 10A-10Z can be differentiated between the computing node stacks, e.g., some stacks can provide traditional bare metal machine operation, other stacks can include a hypervisor that hosts virtual machines (VMs) 260 having respective guest operating systems (OS), and other stacks can include container-based VMs deployed by processes herein, e.g., running on top of a hypervisor-based VM or running on a computing node stack that is absent of a hypervisor. A plurality of different configurations is possible.

Computing environment 140, in addition to having computing node stacks 10A-10Z, can include manager 210 that runs availability management process 211. Manager 210 running availability management process 211 can adjust a hosting configuration for a given application to achieve a specified Service Level Agreement (SLA) requirement.

Manager 210 running availability management process 211 can adjust an availability rating for a given application, e.g., by migrating the application to a different computing node stack of computing environment 140, adding instances of the application and/or subtracting instances of application. In addition, manager 210 of respective ones of computing environments 140A-140Z can be in communication with orchestrator 110, e.g., for sending metrics data to orchestrator 110 and/or for responding to hosting adjusting data from orchestrator 110.

Referring to further aspects of computing environment 140, computing environment 140 can include storage system 240. Storage system 240 can include storage devices 242A-242Z, which can be provided by physical storage devices. Physical storage devices of storage system 240 can include associated controllers. Storage devices 242A-242Z can be provided, e.g., by hard disks and Solid-State Storage Devices (SSDs). Storage system 240 can be in communication with computing node stacks 10A-10Z by way of a Storage Area Network (SAN) and/or a Network Attached Storage (NAS) link.

According to one embodiment, computing environment 140 can include fibre channel network 170 providing communication between respective computing node stacks 10A-10Z and storage system 240. Fibre channel network 170 can include a physical fibre channel that runs the fibre channel protocol to define a SAN. NAS access to storage system 240 can be provided by computing environment network 280 which can be an IP-based network. Manager 210 can be in communication with computing node stacks 10A-10Z by way of computing environment network 280.

Computing environment 140 can host, as part of a deployed application, one or more VM, (e.g., defined by a hypervisor-based VM or a container-based VM), one or more agent 268, and/or one or more tool 270. The one or more agent 268 and/or tool can be installed to run on top of a VM and/or can be installed as system level software.

Data repository 108 can store various data. In registry 2121, data repository 108 can store identifiers for application deployment software code instances. The identifiers can be associated to one or more identifier of an asset deployment software code instance for deployment of an asset defining the application. Within data repository 108, a certain application can include identifiers for instances of software code for deployment of the certain application on different respective computing environments of computing environments 140A-140Z, and an identifier for a generated computing environment agnostic semantic tree data structure that expresses a workflow pattern for deploying the application. For each new application identified for deployment by orchestrator 110, orchestrator 110 can assign an identifier to the application and can record in registry 2121 respective identifiers for respective instances of asset deployment software code for deployment of the certain application on respective different computing environments and an identifier for a computing environment agnostic semantic tree data structure associated to the certain application. There can be specified in registry area 2121 deployment software code instances associated to each respective computing environment in which the certain application has been deployed or may be deployed. An application deployment code instance can comprise asset deployment code instances for deployment of one or more asset defining the application. In registry area 2121, there can be specified identifiers for such asset deployment software code instances, as well as identifiers for computing environment agnostic asset deployment semantic tree data structures associated to such asset deployment code instances. An application deployment software code instance can facilitate an infrastructure as code (IAC) deployment.

Embodiments herein recognize that application deployment software code for deployment of a given application, according to an IAC deployment, can be differentiated between target computing environments. A first computing environment can require application deployment software code instances in a first domain specific language (DSL), and a second computing environment can require application deployment software code instances in a second domain specific language (DSL). Differences between application deployment software code instances associated to different computing environment domains can also be attributable, e.g., to protocol differences between the computing environment domains, connection credential differences between the computing environment domains, and lifecycle calls for execution differences between the different computing environment domains.

Embodiments herein can perform parsing to tokenize a first application deployment software code instance for deployment of a certain application on a first computing environment and based on the tokenizing can provide a computing environment agnostic semantic tree data structure associated to the certain application. Orchestrator 110 can then use the generated computing environment agnostic semantic tree data structure for composing a second application deployment software code instance for deployment of the certain application on a second computing environment of computing environments 140A-140Z.

In code area 2122, data repository 108 can store instances of application deployment software code for deployment of a certain application on one or more computing environment of computing environments 140A-140Z as specified in registry 2121 and instances of asset deployment software code for deployment of an asset on one or more computing environment of computing environments 140A-140Z as specified in registry 2121. An application deployment software code for deployment of a certain application can reference and include one or more asset deployment software code instance. In trees area 2123, data repository 108 can store a semantic tree data structure generated by orchestrator 110 associated to the certain application.

In decision data structures area 2124, data repository 108 can store mapping data for converting computing environment specific deployment software code instances to computing environment agnostic semantic tree data structures as well as mapping data for composing computing environment specific software code instances from the computing environment agnostic semantic tree data structure. Decision data structures area 2124 can include instances of code to tree mapping data 2125A-2125Z as well as tree to code mapping data 2126A-2126Z. Each instance of code to tree mapping data 2125A-2125Z can be associated to a respective one computing environment of computing environments 140A-140Z. Each instance of tree to code mapping data 2126A-2126Z can be associated to a respective one computing environment of computing environments 140A-140Z. Orchestrator 110 can use a particular instance of code to tree mapping data 2125A-2125Z to convert a computing environment specific application deployment software code instance for deployment of a certain application to a computing environment agnostic semantic tree data structure expressing a workflow pattern for deploying the certain application. Orchestrator 110 can use a specific instance of tree to code mapping data 2126A-2126Z associated to a specific computing environment of computing environments 140A-140Z to compose a second application deployment software code instance for deployment of the certain application on a second computing environment using the computing environment agnostic semantic tree data structure that expresses a workflow pattern for deployment of the certain application.

For each computing environment in which an application deployment software code instance for deployment of a certain application may be installed, there can be provided an instance of code to tree mapping data 2125A-2125Z. Code to tree mapping data can include mapping data for conversion of a computing environment specific application deployment software code instance to a certain computing environment into a computing environment agnostic semantic tree data structure expressing a workflow pattern for deployment. The different instances of tree to code mapping data 2126A-2125Z can include mapping data for composing computing environment specific application deployment software code instances for deployment of a certain application based on the computing environment agnostic semantic tree data structure expressing a deployment workflow pattern for deploying the certain application.

Orchestrator 110 can run various processes. Orchestrator 110 miming parsing process 111 can include orchestrator 110 miming tokenizing process 111A and tree generating process 111B. Orchestrator 110 running tokenizing process 111B can include orchestrator 110 performing tokenizing of a computing environment specific application deployment software code instance for deployment of a certain application. In tokenizing a computing environment specific application deployment software code instance for deployment of a certain application, orchestrator 110 can identify attributes of the instance of the software code, e.g., identifiers, keywords, separators, operators, literals, comments, actions, entities, values, and orders of operation.

Orchestrator 110 running tree generating process 111B can include orchestrator 110 using a result of parsing process 111 to convert the computing environment specific application deployment software code instance for deployment of a certain application on a particular computing environment into a computing environment agnostic semantic tree data structure. In providing the computing environment agnostic semantic tree data structure, orchestrator 110 running tree generating process 111B can use an instance of code to tree mapping data 2125A-2125Z associated to the particular computing environment. Orchestrator 110 running tree generating process 111B can provide a computing environment agnostic semantic tree data structure associated to the certain software application.

Orchestrator 110 running composition process 112 can use the semantic tree data structure resulting from tree generating process 111B to provide a computing environment specific application deployment software code instance for deployment of the certain application on a specific computing environment. In providing the computing environment specific application deployment software code instance for deployment of the certain application using the computing environment agnostic semantic tree data structure expressing a generic deployment workflow pattern for deploying the certain application, orchestrator 110 running composition process 112 can use an instance of tree to code mapping data 2126A-2126Z associated to the specific computing environment.

Orchestrator 110 running composition process 112 can provide a computing environment specific application deployment software code instance associated to the certain software application for deployment of the certain software application. Orchestrator 110 running composition process 112 can provide a computing environment specific application deployment software code instance for deployment of the certain application associated to the computing environment specific application deployment software code instance subject to processing by parsing process 111 on a different computing environment of computing environments 140A-140Z.

A method for performance by orchestrator 110 interoperating with UE device 120A and computing environments 140A-140Z is illustrated in connection with the flowchart of FIG. 2.

UE device 120A at block 1201 can be sending developer user-defined data for receipt by orchestrator 110. Developer user-defined data sent at block 1201 can be defined by a developer user using a user interface displayed on UE device 120A adapted for software development assistance. The displayed user interface can be associated to a certain computing environment of computing environments 140A-140Z. Embodiments herein recognize that different ones of computing environments 140A-140Z can present and make available to developer users different user interfaces for development of software code for deployment of applications on their specific computing environment. At block 1201, a developer user associated to orchestrator 110 can be using one of such user interfaces associated to a certain one of computing environments 140A-140Z for development of a computing environment specific software code instance for deployment of a certain application on the certain computing environment of computing environments 140A-140Z. In one embodiment, an application deployment software code instance can reference one or more asset deployment software code instance, forming part of the application software deployment code instance, and in some cases, at least one of the one or more asset deployment software code instance can be previously stored in data repository 108. In some use cases, a developer user in building an application deployment software code instance can use one or more prior-developed asset deployment software code instance previously referenced in registry 2121 and stored in code area 2122. A user interface displayed to the developer user can make available such software code instances to a user in the development of new application software code instances.

At block 1201, UE device 120A can be sending developer user-defined data based on the inputs defined by a developer user using the described user interface displayed on UE device 120A. Inputs can be inputs defined by a developer user. An application deployed with use of an application deployment software code instance subject to deployment based on user-defined data can take on numerous forms. Applications for deployment herein can include, e.g., customer service applications, data mining applications, word processing application, and financial transaction applications including banking applications, self-driving vehicle applications, factory automation applications, Internet of Things (IoT), sensor processing applications, and the like. Embodiments herein recognize that a developer user, because of the specific requirements for hosting an application on a certain one computing environment of computing environments 140A-140Z, can spend considerable time, including time for manual development of application deployment software code instances for deployment of the certain application on multiple computing environments. Due to the fact that the different computing environments of computing environments 140A-140Z can include different requirements such as different domain specific language (DSL) requirements, a developer user can be required to manually re-code a previously developed application deployment software code instance for deployment of the same certain application on a different computing environment of computing environments 140A-140Z.

At the same time, embodiments herein recognize that it can be beneficial to adjust a hosting arrangement for hosting a certain application. For example, over time, a second computing environment may offer improved performance over a first computing environment in which an application is initially hosted. In another example, a computing environment in which a certain application is initially hosted can exhibit degraded performance. In another example, embodiments herein recognize that it may be beneficial to host a certain application on multiple computing environments according to variable scaling ratios to assure consistent performance over time and avoidance of delays associated to initiating hosting on a new computing environment. In another example, embodiments herein recognize that it can be beneficial in some circumstances to host a certain application on both a private computing environment and a public computing environment. Hosting on a private cloud computing environment in which an application is hosted on infrastructure owned by an entity that owns the application is advantageous for a variety of reasons, including for assurance of access to computing resources and for data security.

Embodiments herein can provide for automatic generation of a computing environment specific application deployment software code instance for installation of a certain application on a second computing environment after an application deployment software code instance for deployment of the certain application on a first computing environment has been developed. Accordingly, embodiments herein can significantly speed the hosting of the certain application on multiple computing environments and can avoid a requirement of a developer manual re-code for deployment on a new computing environment.

Continuing with the flowchart of FIG. 2, orchestrator 110 at block 1101 can ascertain whether an application deployment software code instance being developed by a developer user is ready for use in deploying of the certain application being developed. For performance of block 1101, orchestrator 110, according to one embodiment, can be running a semantic analyzer, and in some instances an emulator, in order to determine whether the application deployment software code instance is ready for installation in a certain one computing environment of computing environments 140A-140Z. On determining that the application deployment software code instance being developed is ready for installation, orchestrator 110 can proceed to block 1102.

At block 1102, orchestrator 110 can send the developed computing environment specific application deployment software code instance determined ready for installation into data repository 108, which can receive and store the developed application deployment software code instance at receive and store block 1081. If the application deployment software code instance being developed is determined not to be ready for deployment, orchestrator 110 can return to a stage prior to block 1101 for receipt of additional developer user-defined data and orchestrator 110 can perform the loop of block 1101 until a time that orchestrator 110 at block 1101 determines that the application deployment software code instance is ready for installation for deployment of the application associated to the application deployment software code instance.

On completion of block 1102, orchestrator 110 can proceed to block 1103. At block 1103, orchestrator 110 can send a deployment package for deploying of an application of an application deployment software code instance on a target computing environment of computing environments 140A-140Z. On receipt of the deployment package, the target computer environment, e.g., computing environment 140A of computing environments 140A-140Z, can install the deployment package at block 1401. The deployment package sent at block 1103 can be defined by the application deployment software code instance determined at block 1101 to be ready for deployment.

In one embodiment, the deployment package sent at block 1103 can include a computing environment specific application deployment software code instance for installing one or more asset and in one embodiment, the computing environment specific application deployment software code instance can include a computing environment specific application deployment software code for (a) installation of a virtual machine (VM), (b) installation of a software agent, and (c) installation of a software tool. In some embodiments, installation can include less than the above elements or more than the above elements. In one embodiment, multiple VMs can be installed. In some embodiments, multiple agents can be installed, and in some embodiments, multiple tools can be installed. VMs specified for installation with a deployment package can include, e.g., hypervisor-based VMs or container-based VMs.

With further reference to the flowchart of FIG. 2, computing environment 140A defining an initial target computing environment in the described scenario can deploy the deployment package at block 1401, and at deployment block 1402, the target computing environment 140A can send status data indicating the status of the deployment. Orchestrator 110, on receipt of the status data at block 1104, can ascertain whether the deployment of the deployment package sent at block 1103 was successful. On determination by orchestrator 110 that the deployment has not been successful, orchestrator 110 can return to a stage prior to block 1101 and can iteratively perform the loop of blocks 1101-1104 until a developed application deployment software code instance for deployment of the certain application is installed for successful deployment of the certain application.

On determination that deployment was successful at block 1104, orchestrator 110 can proceed to block 1105. At block 1105, orchestrator 110 can run parsing process 111 to parse the deployed application deployment software code instance. At parsing block 1105, orchestrator 110 can run parsing process 111 to parse the application deployment software code instance deployed at block 1101. Parsing at block 1105 can include tokenizing the deployed computing environment specific application deployment software code instance to identify attributes of the instance of the application deployment software code instance, e.g., identifiers, keywords, separators, operators, literals, comments, actions, entities, values, and orders of operation.

In one embodiment, orchestrator 110 can perform parsing block 1105 using a Java Compiler Compiler (JavaCC) parser. JavaCC is an open-source project released under the BSD license 2.0. Orchestrator 110 running parsing block 1105 can include orchestrator 110 running parsing process 111 which can include tokenizing process 111A and tree generating process 111B. Orchestrator 110 running parsing block 1105 can also run various other parsing processes, e.g., syntax check processing resulting in rejection of an input computing environment specific application deployment software code instance in the case that syntax rules for the relevant domain are violated.

At block 1105, orchestrator 110 can run tokenizing process 111A to read in a sequence of text-based characters defining a computing environment specific application deployment software code instance and produce a sequence of attributes. In one embodiment, the attributes can include tokens. For producing tokens, orchestrator 110 can apply certain rules defined by the appropriate instance of code to tree mapping data to break a sequence of characters into a sequence of tokens. The rules can be based on the domain specific language (DSL) of the input computing environment specific application deployment software code instance.

Orchestrator 110 running tree generating process 111B can consume a sequence of tokens produced by tokenizing process 111A in order to produce and output a computing environment agnostic semantic tree data structure. A tree building tool for generating a tree data structure can be provided by, e.g., JJ Tree and or GTP Java tree builder. In performing tree generation, orchestrator 110 can identify by examining parsing extracted identifiers a computing environment domain of the input computing environment specific application deployment software code instance and select an appropriate instance of code to tree mapping data 2125A-2125Z based on the identified domain identified from the tokenizing. Orchestrator 110 can be configured so that as computing environment specific application deployment software code instances are developed, orchestrator 110 can add a label to the computing environment specific application deployment software code instance specifying the computing environment domain. Orchestrator 110 can read such labels when the computing environment specific application deployment software code instance is later parsed.

In one embodiment, orchestrator 110 running tokenizing process 111A can identify attributes of input computing environment specific application deployment software code instance and in running tree generating process 111B can use the identified attributes for generation of semantic tree data structure. In one embodiment, the attributes can be tokens and orchestrator 110 running tokenizing process 111A can identify attributes of input computing environment specific application deployment software code instance in the form of tokens and in running tree generating process 111B can use the identified tokens for generation of an application deployment semantic tree data structure. Tokens can include, e.g., identifiers, keywords, separators, operators, literals, comments, actions, entities, values, and orders of operation. Identified tokens can include token classifiers as well as text string data defining the identified tokens.

Orchestrator 110 running tree generating process 111B can build a computing environment agnostic semantic tree data structure that specifies and expresses the deployment workflow pattern of an input computing environment specific application deployment software code instance. The generated tree data structure can be a computing environment agnostic ordered rooted tree that represents the syntactic structure of the input string processing parsing process 111.

At parsing block 1105, orchestrator 110 can run tokenizing process 111B and tree generating process 111B to convert the computing environment specific application deployment software code instance subject to tokenizing at block 1105 in order to provide a computing environment agnostic semantic tree data structure associated to the computing environment specific application deployment software code instance subject to parsing at block 1105 based on the result of the tokenizing at block 1105.

Figure 4A:
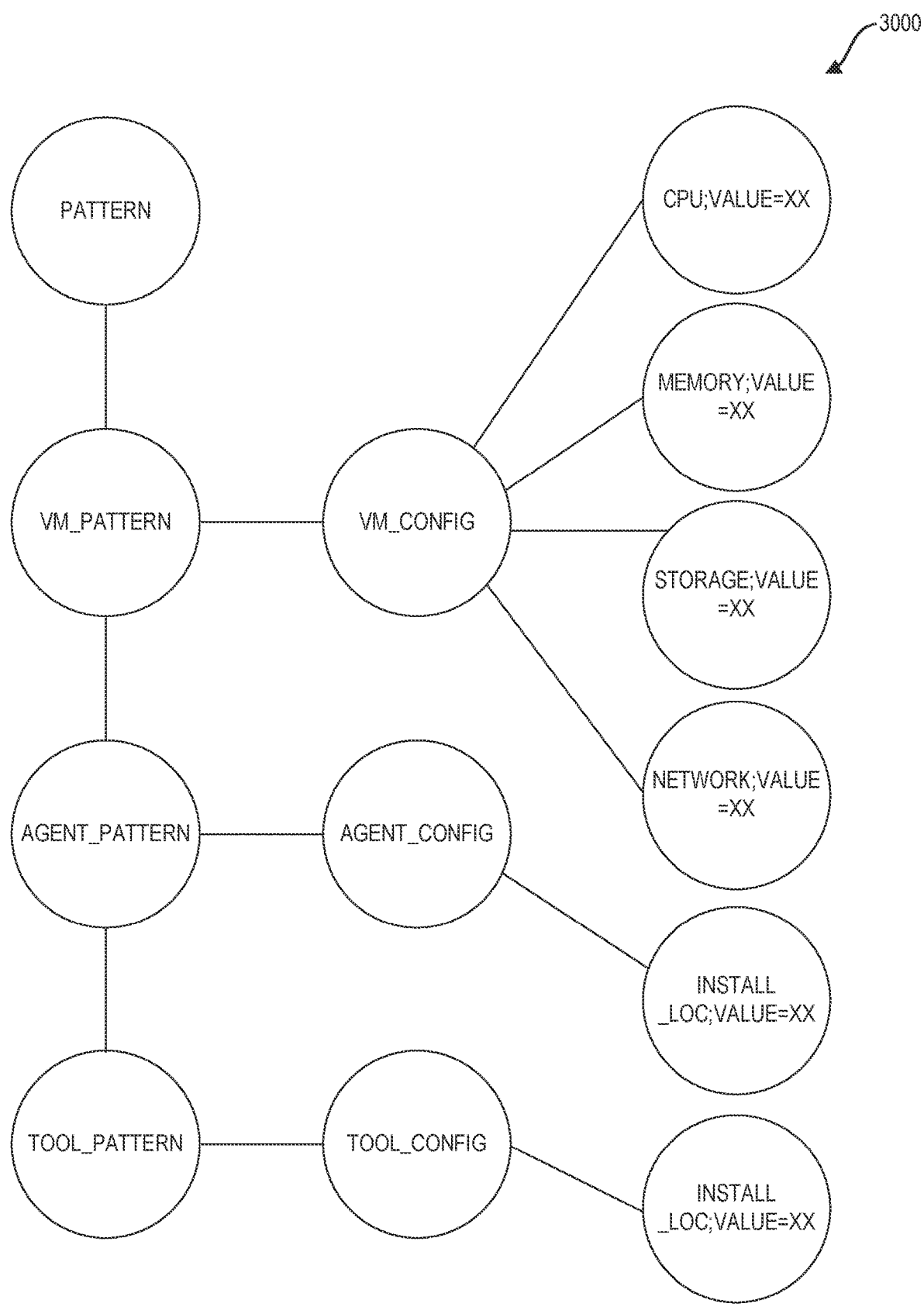
FIG. 4A depicts a semantic tree data structure according to one embodiment.

Generating of a computing environment generic semantic tree data structure generation at block 1105 is described further in reference to Table A hereinbelow showing an exemplary computing environment specific application deployment software code instance subject to parsing at block 1105 and FIG. 4A, illustrating an exemplary semantic tree data structure associated to the computing environment specific application deployment software code instance subject to parsing at block 1105.

Orchestrator 110, in performing tree data structure generating at block 1105, can perform generating based on a result of the tokenizing at block 1105. Tokenizing at block 1105 can include tokenizing to identify attributes of the computing environment specific application deployment software code instance, including, e.g., identifiers, keywords, separators, operators, literals, comments, actions, entities, values, and orders of operation.

In the described scenario, an initial target computing environment can be computing environment 140A. Orchestrator 110 at parsing block 1105 can use an instance of code to tree mapping data 2125A associated to computing environment 140A. Orchestrator 110 at parsing block 1105 can provide a semantic tree data structure as is shown in FIG. 4A associated to the computing environment specific application deployment software code instance to parsing at block 1105 as illustrated in Table A.

TABLE A

```
{
"iem_pattern":
{
"install_loc": "/opt/iem",
"vm_config": {
"cpu": 2,
"hdd": "150GB"
}
}
}
```

The semantic tree data structure shown in FIG. 4A can be computing environment agnostic, i.e., can be free of elements that relate specifically to a particular one of computing environments of computing environments 140A-140Z, but rather can be generic and can apply to any and all computing environments of computing environments 140A-140Z.

Figure 4B:
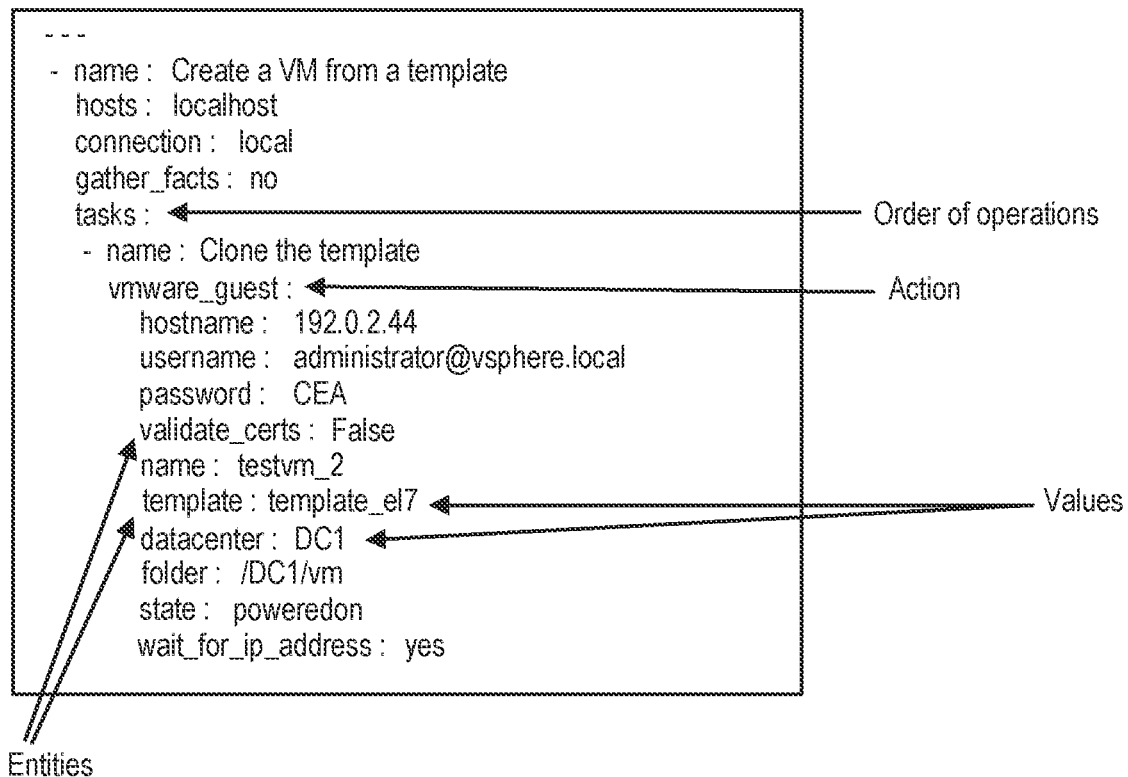
FIG. 4B depicts a computing environment specific asset deployment software code instance according to one embodiment.
Figure 4C:
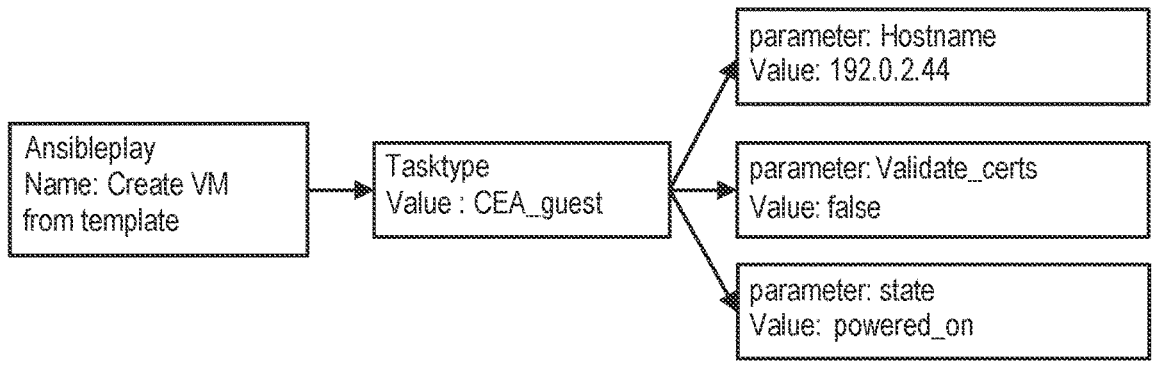
FIG. 4C depicts a semantic tree data structure according to one embodiment.
Figure 4D:
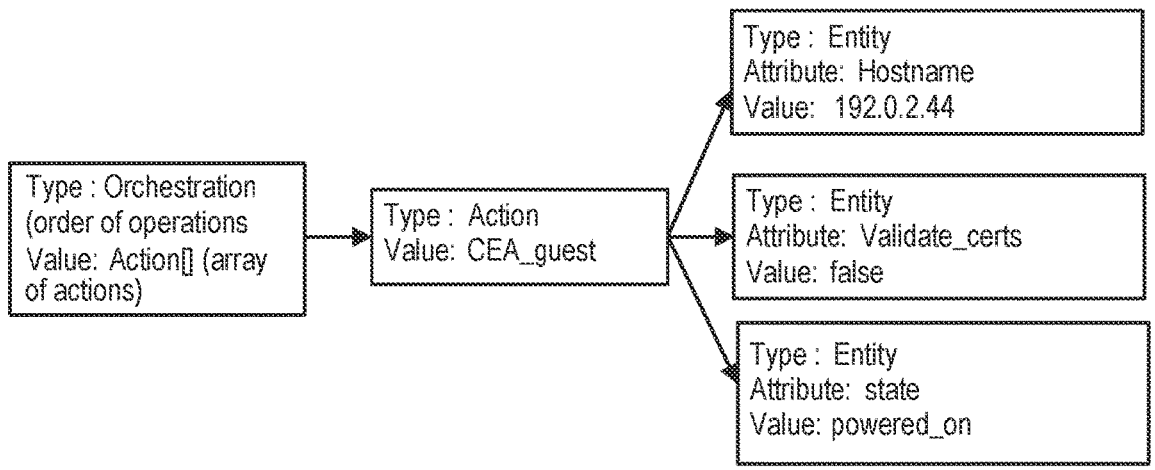
FIG. 4D depicts a semantic tree data structure according to one embodiment.

Additional features for the providing of an application deployment semantic tree data structure are described in reference to FIGS. 4B-4D. In FIG. 4B, there is shown an exemplary application deployment software code instance, written in ANSIBLE® for creating a VM on the computing environment CEA. ANSIBLE® is an open-source software provisioning, configuration management, and application-deployment tool enabling infrastructure as code. ANSIBLE® is a registered trademark of Ansible, Inc.

Embodiments herein recognize that an IAC code instance will follow a set of grammatical rules. For example, in the IAC code instance, one of the grammatical rules will specify: "The IAC code will start with a - (dash symbol) followed by the keyword 'name' followed by a : (colon symbol) followed by a string."

For providing an instance of code to tree mapping data 2125A-2125Z, there can be established for each respective supported computing environment of computing environments 140A-140Z a token specification and a set of grammatical rules. In the highlighted example respective to computing environment CEA, a token specification can be established as set forth in Table B.

TABLE B

```
TOKEN : {
    <ACTION_NAME : "name">
    |<SEPARATOR: ":">
    |< STRING: (["a"-"z","0"-"9"])+ >
}
```

In the highlighted example respective to computing environment CEA, grammatical rules can include rules as set forth in Table C.

TABLE C

```
ActionDefinition( ) :
{
    <ACTION_NAME><SEPARATOR><STRING>
}
```

With use of the described token specification, a set of tokens in the described example can be provided as shown in Table D.

TABLE D

| Token Name | Token Value |
| --- | --- |
| ACTION_NAME | name |
| SEPARATOR | : |
| STRING | Create a VM from Template |

Orchestrator 110, with use of the set of grammatical rules active for computing environment CEA, can check the sequence at which tokens appear and can raise errors when appropriate.

With use of the parsing specification and the set of grammatical rules defining an instance of code to tree mapping data for computing environment CEA, orchestrator 110 can provide a provisional asset deployment semantic tree data structure as shown in FIG. 4C. Referring to FIG. 4C, all the tree elements are specific to ANSIBLE® style of IAC. According to one embodiment, orchestrator 110 can use a design pattern called "visitor pattern" to traverse through the computing environment specific asset deployment semantic tree data structure for providing the computing environment agnostic asset deployment semantic tree data structure as shown in FIG. 4D.

For deployment of the asset referenced in the computing environment agnostic asset deployment semantic tree data structure as shown in FIG. 4D onto a new computing environment CEB, orchestrator 110 can use the instance of tree to code mapping data 2126B associated to CEB. The instance of tree to code mapping data 2126B associated to CEB can include an inverse set of grammatical rules that is established as the inverse of the set of grammatical rules defining the code to tree mapping data instance 2125B for the computing environment CEB.

In one aspect, an application deployment software code instance for deployment of an application can include one or more referenced asset deployment software code instance provided by a code segment for deployment of one or more asset. Assets for deployment which can define an application can include, e.g., VM assets, agent assets, and tool assets. An application deployment code instance for deploying an application having a VM, agent, and tool can include a first asset deployment software code instance and code segment for deploying the VM, a second asset deployment software code instance and code segment for deploying the agent, and a third asset deployment software code instance and code segment for deploying the tool. Deploying an application having multiple assets can include performing of workflow patterns for deploying the multiple assets. In performing parsing at block 1105 of an application deployment software code instance for deploying an application having multiple assets, orchestrator 110 can perform tokenizing of the incoming application deployment code instance to identify attributes thereof and can generate a semantic tree data structure that specifies the operation workflow patterns for deployment of the multiple assets. An application deployment tree data structure associated to an application deployment software code instance for deployment of an application having multiple assets can comprise a combination of asset deployment semantic tree data structures, each asset deployment tree data structure expressing operations of an asset deployment workflow pattern. In such a situation, orchestrator 110 parsing an application deployment software code instance can generate multiple asset deployment semantic tree structures associated to the multiple assets defining the software application. In one embodiment, a deployed application can include a single asset, e.g., just a VM. In such a situation, orchestrator 110 parsing an application deployment software code instance can generate an application deployment semantic tree structure having a single asset deployment semantic tree data structure.

As set forth herein, a software code instance for deployment of an application can comprise software code for deployment of one or more asset, e.g., one or more virtual machine VM, one or more agent, and/or one or more tool. Deployment of a software asset can include workflow pattern. In one embodiment, the deployment of an application can include an application workflow pattern that comprises an asset workflow pattern for deployment of an asset defining the application. In one embodiment, the deployment of an application can include an application workflow pattern that comprises a combination of asset workflow patterns for deployment of multiple assets defining the application.

In one embodiment, the deployment of an application can include (a) a workflow pattern for deployment of a VM asset, (b) a workflow pattern for deployment of an agent asset, or (c) a workflow pattern for deployment of a tool asset. A VM asset can comprise, e.g., a hypervisor-based VM or container-based VM. An agent asset can be an asset which when deployed defines a secondary program that communicates with a primary program. The primary program can be, for example, deployed on a computing node 10 (FIG. 2) that hosts the deployed VM of the application or computing node associated to manager 210 of computing environment 140 (FIG. 2). One exemplary scenario in agent asset can be provided by logging agent asset. A tool asset can refer to the standalone program hosted on a VM that communicates with users via clients or otherwise operates independent of and without communications to a primary program.

Workflow deployment patterns for deployment of an application can include one or more workflow deployment pattern for deploying one or more asset, e.g., a VM asset, agent asset, or tool asset.

A VM deployment workflow pattern can include, e.g., (i) checking availability of a VM image within a VM image repository of the target computing environment and obtaining the image; (ii) triggering the image on the selected hypervisor; (iii) checking and establishing all networks for support of the new VM; or (iv) configuring all parameter values for running of the VM, including e.g., hostname, IP address for the VM, a CPU configuration parameter value, a memory configuration parameter value for configuring a volatile memory, and a storage configuration parameter value. An agent deployment workflow pattern can include (i) checking availability of binary file data defining the agent, (ii) validating the binary file data, (iii) installing the binary file data defining the agent, and (iv) registering the newly installed agent with the primary program to which the agent communicates. A tool deployment workflow pattern can include (i) checking the availability the availability of the binary file data defining the tool, and (ii) installing the binary file data defining the tool.

When application deployment code is stored at block 1081, orchestrator 110 can label code segments defining the software code instance, and these label identifiers can be stored into registry 2121. Example registry data is shown in Table A.

TABLE A

| Row | Computing environment domain specific software code instance | Computing environment domain agnostic tree structure? | Child asset deployment software code instances referenced |
|---|---|---|---|
| 1 | 006-AP-CEA | YES, T006 | 119-AS-CEA; 237-AS-CEA; 312-AS-CEA |
| 2 | 119-AS-CEA | YES, T119 | — |
| 3 | 237-AS-CEA | YES, T237 | — |
| 4 | 312-AS-CEA | YES, T312 | — |
| 5 | 006-AP-CEB | YES, T006 | 119-AS-CEB; 237-AS-CEB; 312-AS-CEB |
| 6 | 119-AS-CEB | YES, T119 | — |
| 7 | 237-AS-CEB | YES, T237 | — |
| 8 | 312-AS-CEB | YES, T312 | — |
| 9 | 029-AP = CEA | NO | 119-AS-CEA; 288-AS-CEB |
| 10 | X45-AS-CEC | NO | — |

Referring to the registry data of Table A, orchestrator 110 can assign for application code instances an identifier. As shown in Table, A, the identifiers can have a first field specifying an identifier for a workflow operation, a second field specifying software code deployment type, application deployment (AP) or asset deployment (AS), and a third field specifying the computing environment domain of the software code instance. Software code instances specified in the registry data can include application deployment software code instances which reference one or more child asset deployment software code instances. In Table A, the application deployment software code instance 006-AP-CEA can define a workflow pattern in which a VM, agent, and tool are deployed. According to one design, application deployment workflow patterns can be assigned the range 000-099, VM asset deployment patterns can be assigned the range 101-199, agent asset deployment patterns can be assigned the range 201-299, and tool asset deployment patterns can be assigned the range 301-399. As is seen in Table A, orchestrator 110 can update registry 2121 when orchestrator (a) generates a computing environment domain agnostic tree structure associated to software code instance, and (b) composes a computing environment domain specific software code instance using a computing environment domain agnostic tree structure. For example, orchestrator 110, when generating a semantic tree data structure for the application deployment software code instance, can update Rows 1-4 of Table A, can update the tree structure column to "YES," and when composing computing environment specific software code for the domain CEB, can update the registry data to include rows 5-8 as indicated in Table A.

In one aspect, in performing parsing at block 1105, orchestrator 110 can determine whether the incoming computing environment specific application deployment software code instance being parsed has been previously recorded into registry 2121. In parsing an incoming application deployment software code instance, orchestrator 110 can extract identifiers for an application deployment software code instance and can extract identifiers for asset deployment software code instances. If on the examination of registry data, orchestrator 110 determines that an asset deployment tree data structure for a referenced asset deployment software code instance has been stored in trees area 2123 of data repository 108, orchestrator 110 need not reproduce the tree structure, but rather can merely reference the prior generated tree structure previously generated. Accordingly, by the described method, orchestrator 110 can conserve processing resources and increase processing speed.

Orchestrator 110 at block 1106 can assign identified actions and identified entities identified from performance of parsing block 1105 to respective nodes of a semantic tree data structure and can arrange edges between the various nodes of a semantic tree data structure in accordance with an order of operation of actions identified as a result of the parsing at block 1105. At converting block 1106, orchestrator 110 can further assign values identified as a result of the parsing at block 1105 to various nodes of the semantic tree data structure so that values are associated to various nodes that are associated to various entities.

For example, with reference to the semantic tree data structure 3000 of FIG. 4A, orchestrator 110 can assign a certain parameter value associated to a CPU node of semantic tree data structure, can assign a certain memory value associated to a memory node as indicated in the semantic tree data structure of FIG. 4A, can assign a certain storage parameter value associated to the storage node of the semantic tree data structure, and can assign a network parameter value associated to the network node of the semantic tree data structure shown in FIG. 4A. Further examples of orchestrator 110 assigning identified actions and identified entities identified from performance of parsing block 1105 to respective nodes of a semantic tree data structure and arranging edges between the various nodes of a semantic tree data structure in accordance with an order of operation of actions identified as a result of the parsing at block 1105 are described with reference to the semantic tree data structures of FIGS. 4C and 4D.

As a result of the parsing including tree generation at block 1105, a semantic tree data structure as indicated in FIGS. 4A and 4C-4D can include nodes associated to entities and actions referenced in installation software code and edges representing an order of operation between installation actions. For example, edges of a semantic tree data structure can indicate an order of operation of actions for deployment of a certain application. For deployment of a software application, according to one embodiment, there can initially be installation of a VM followed by installation of an agent followed by installation of a tool. The semantic tree data structure resulting from the parsing at block 1105 can be computing environment agnostic, i.e., can be free of elements that are specific to any one computing environment of computing environments 140A-140Z.

Once provided, a computing environment agnostic semantic tree data structure can be used by orchestrator 110 to facilitate composing of new application deployment software code instances for installing the certain application associated to a generated semantic tree data structure, e.g., as indicated in FIGS. 4A and 4C-4D on different computing environments 140A-140Z.

On completion of parsing block 1105, orchestrator 110 can proceed to send block 1106. At send block 1106, orchestrator 110 can send the completed semantic tree data structure generated at block 1105 for storage into tree area 2123 of data repository 108.

On completion of send block 1106, orchestrator 110 can proceed to evaluating block 1107. In evaluating block 1108, orchestrator 110 can evaluate performance of the current target computing environment 140A, as well as additional ones of computing environments of computing environments 140A-140Z. Evaluating at block 1107 can be performed based on received metrics data which can be sent from computing environments 140A-140Z on an iterative basis at block 1403. The metrics data can include metrics data indicating the performance attributes of computing environments 140A-140Z. Computing environment performance attributes can include such attributes as services parameter values, scalability parameter values, cost (e.g., on a per instance basis) parameter values, service level agreement (SLA) parameter values, e.g., response time parameter values, throughput parameter values, CPU usage parameter values, memory usage parameter values, storage usage parameter values, and availability parameter values.

On performance of evaluating block 1107, orchestrator 110 can proceed to action decision block 1108. At action decision block 1108, orchestrator 110 can ascertain whether a current deployment arrangement for deploying a current application should be adjusted. At action decision block 1108, orchestrator 110 can ascertain whether a condition has been satisfied for adjustment of a current hosting arrangement for hosting the current application having the associated application deployment software code instance subject to parsing at block 1105.

The action decision at action decision block 1108 can be in dependence on a result of the evaluating at block 1107. At action decision block 1108, orchestrator 110 can determine, e.g., that the current application hosted on target computing environment 140A is to be hosted, additionally or alternatively, on a second target computing environment of computing environments 140A-140Z, e.g., computing environment 140B.

In one scenario, the computing environment, e.g., 140A operating as a current target hosting computing environment, can be a publicly accessible multitenancy computing environment, and computing environment 140B can be a private computing environment, i.e., owned, operated, and/or controlled by the entity enterprise entity owning the application subject to hosting In one scenario, computing environment 140A, in the described example operating as a current target hosting computing environment, can be a private computing environment, i.e., owned, operated, and/or controlled by an enterprise entity owning the application subject to hosting and computing environment 140B operating as a candidate next target hosting a computing environment which can be a publicly accessible multitenancy computing environment, e.g., public cloud.

At action decision block 1108, orchestrator 110 can apply a condition to determine whether a current hosting arrangement for the certain application is to be adjusted. On the determination that adjustment is not to occur, orchestrator 110 can loop back to a stage prior to evaluating block 1108 to receive a next iteration metrics data and can iteratively perform the loop of blocks 1107-1108 until orchestrator 110 determines at block 1108 that adjustment of a current hosting arrangement for hosting the current application is to be performed. On the determination at block 1108 that hosting arrangement adjustment is to be performed, orchestrator 110 can proceed to composing block 1110. At composing block 1109, orchestrator 110 can perform composing to compose a second computing environment specific application software code instance for hosting the current application on a different target computing environment of computing environments 140A-140Z, e.g., second target computing environment 140B.

Orchestrator 110 performing composing block 1110 can include orchestrator 110 running composition process 112 to perform composing at block 1110. Orchestrator 110 performing composing at block 1110 can include orchestrator 110 using the computing environment agnostic semantic tree data structure 3000 output by parsing block 1105 and stored at block 1082. Performance of composing block 1110 can include multiple queries of data repository 108 as indicated by receive and respond block 1084.

At composing block 1110, orchestrator 110 can use an instance of tree to code mapping data 2126B of instances 2126A-2126Z associated to the second target computing environment identified 140B identified at action decision block 1109. By use of the appropriate instance of tree to code mapping data 2126B associated to computing environment 140B, the computing environment specific application deployment software code instance output as a result of the composing at block 1109 can have attributes, e.g., domain specific language (DSL) attributes associated to computing environment 140B defining a second target computing environment in the described scenario. Orchestrator 110 at composing block 1110 can use computing environment agnostic semantic tree data structure 3000 for composing a computing environment specific application deployment software code instance for hosting the current application associated to the computing environment specific application deployment software code instance subject to parsing at block 1105 on second target computing environment 140B.

On completion of composing block 1109, orchestrator 110 can proceed to send block 1110. At block 1110, orchestrator 110 can send a deployment package to computing environment 140B providing a second target computing environment in the described scenario for installation on the second target computing environment 140B. The deployment package sent at send block 1110 can be defined by the composed computing environment specific application deployment software code instance composed at block 1109. On receipt of the deployment package sent at block 1110, computing environment 140B defining a second target computing environment at deploy block 1404 can install and deploy the received deployment package. On completion of deploy block 1404, computing environment 140B, in the described scenario at send block 1405, can send status data indicating the status of the deployment performed at block 1404. On receipt of the status data, orchestrator 110 at action decision block 1111 can ascertain based on the status data whether the deployment at block 1404 was successful.

On determination at action decision block 1111 that the deployment at block 1404 is not successful, orchestrator 110 can loop back to a stage prior to composing block 1110 and the installation code can be recomposed at a next iteration of composing block 1110 and sent at a next iteration of send block 1110. Orchestrator 110 can perform the loop of block 1110 and 1111 until orchestrator 110 at action decision block 1111 determines based on the received status data sent at block 1405 that the deployment performed at block 1404 was successful. On the determination by orchestrator 110 at decision block 1111 that deployment was successful, orchestrator 110 can return to a stage prior to block 1107 to receive a next iteration of metrics data sent at block 1403.

Orchestrator 110 can be iteratively performing the loop of blocks 1107-1111 to iteratively evaluate next iterations of received metrics data from computing environments 140A-140Z. Orchestrator 110 at iterations of evaluating at evaluating block 1107 can evaluate the incoming metrics data and at action decision block 1108 and can ascertain based on the received metrics data and stored condition stored in data repository 108 whether an adjustment of a current hosting arrangement is to be performed.

Throughout the deployment period of the certain application subject to initial development at block 1201, hosting adjustment conditions can be satisfied so that the hosting of the application can be adjusted numerous times. According to one example, the current application can be initially hosted on computing environment 140A defining an initial target environment and then computing environment 140B defining a second computing environment. In some instances, the hosting on target computing environment 140B can be performed without the shutdown of hosting on computing environment 140A defining an initial hosting computing environment. In some instances, hosting on computing environment 140B of computing environments 140A-140Z defining a second target computing environment can be accompanied by shutdown of hosting on computing environment 140A defining an initial hosting computing environment.

In some use case scenarios, deployment adjusting over time can be characterized by hosting of an application on a third, fourth, or any number of computing environments. Target computing environments can include, e.g., publicly accessible multitenancy computing environments, private computing environments, or a combination of public multitenancy computing environments and private computing environments.

Figure 3:
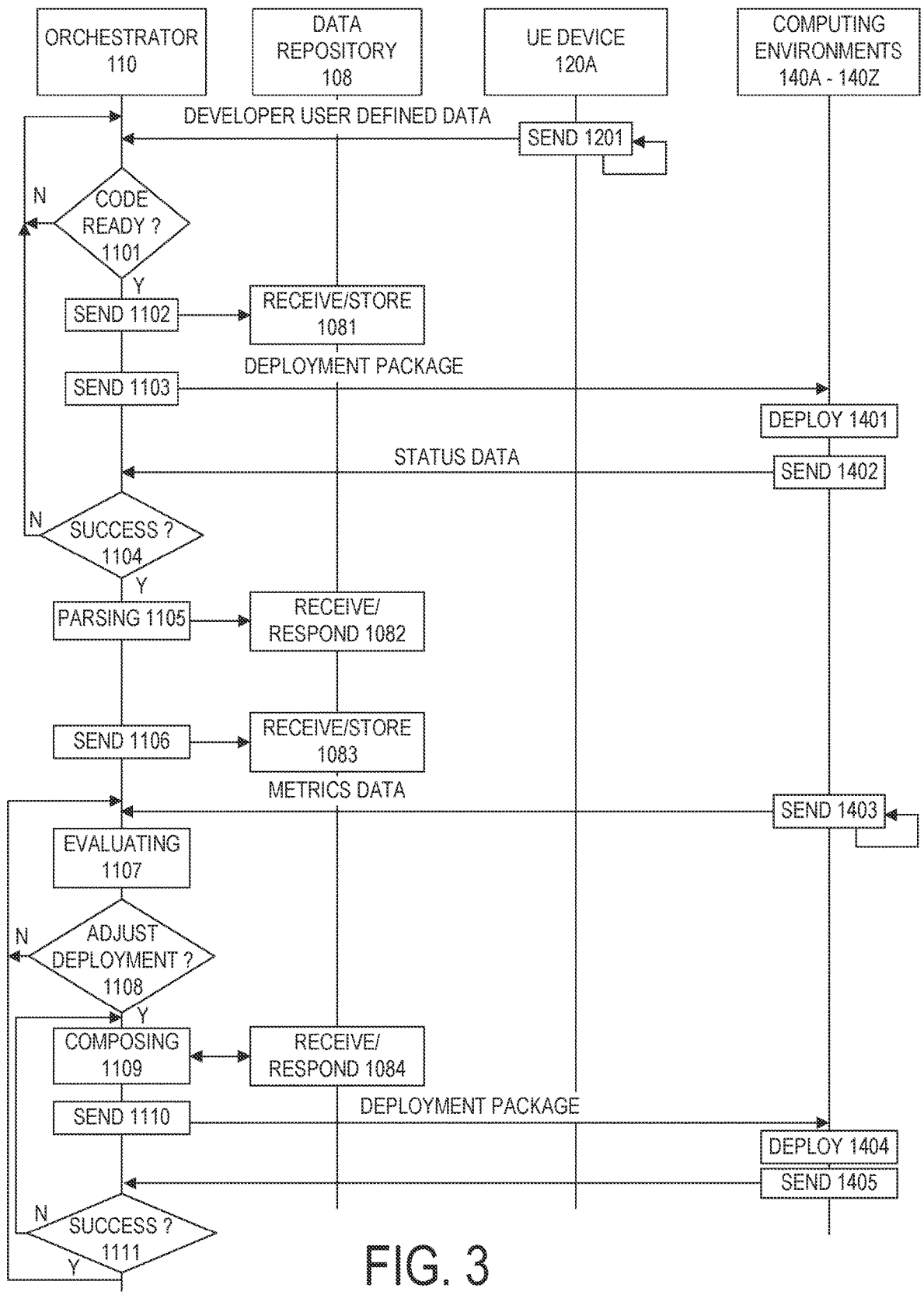
FIG. 3 is a flowchart illustrating a method for performance by an orchestrator interoperating with other components to one embodiment.

In the scenario depicted with respect to the flowchart of FIG. 3, orchestrator 110 in response to sending an application deployment software code instance to a first target computing environment performs parsing of the delivered software code instance to generate computing environment agnostic semantic tree data structure but refrains from composing a computing environment specific application deployment software code instance for deploying the application to a second computing environment until the condition for satisfying the hosting is satisfied. In the embodiment of the flowchart of FIG. 3, orchestrator 110 times the composing of the second computing environment specific application deployment software code instance responsively to the determining that a re-hosting condition has been satisfied.

However, a variety of other use cases are available. In one embodiment, system 100 can be configured so that system 100 refrains from generating a semantic tree data structure associated to computing environment specific application deployment software code instance until a time that a condition is satisfied. The decision Table B depicts a use case in which orchestrator 110 refrains from generating a computing environment agnostic semantic tree data structure until a condition is satisfied.

TABLE B

| Row | Performance Metrics parameter value for CEB (candidate new target computing environment) | Action Decision |
| --- | --- | --- |
| 1 | T1 > P | Refrain from generating semantic tree data structure associated to CEA application deployment software code |
| 2 | T1 <= P < T2 | Responsively to the condition being satisfied, generate semantic tree data structure associated to CEA application deployment software code, and compose CEB specific application deployment software code for the application, but refrain from sending the newly composed CEB specific application deployment software code to CEB for deployment of the application on CEB. |
| 3 | P > T2 | Responsively to the condition being satisfied, send the newly composed CEB specific application deployment software code to CEB for deployment of the application on CEB. |

With respect to Row 1 of Table B, orchestrator 110 can refrain from generating a computing environment agnostic semantic tree data structure associated to computing environment specific application deployment software code instance in the case that the performance metrics parameter value P is less than a first threshold T1. However, if the performance parameter value P becomes equal or greater to the first threshold T1, as indicated by Row 2, orchestrator 110, in anticipation of a re-hosting being satisfied in the near future, can generate the computing environment agnostic semantic tree data structure and can compose a second application deployment software code instance for deploying the application on the second computing environment CEB. However, referring to the condition of Row 2, orchestrator 110 can refrain from sending the newly composed application deployment software code instance to computing environment CEB until a time that a condition of Row 3 is satisfied. Referring to Row 3, orchestrator 110, on the condition that the performance metrics value P exceeds the second threshold T, can proceed to send the newly generated application deployment software code instance for deploying the application on computing environment CEB. Operating under the control of decision Table B, orchestrator 110 can conserve computing resources and can expedite processing by refraining from generating a semantic tree data structure and a second computing environment application deployment software code instance unless a performance metrics parameter value associated to the second computing environment indicates that the second computing environment is approaching but has not yet obtained a performance characteristic that renders it suitable for hosting. When an action decision (Row 3) is returned to re-host, the re-hosting can be expedited given that the computing environment specific application code instance for performance of the re-hosting has already been composed and is ready for use (Row 2). In the embodiment of Table B, orchestrator 110 times the composing of the second computing environment specific application deployment software code instance responsively to the determining that a re-hosting condition may become satisfied in the near future so that when a re-hosting condition is satisfied, the second computing environment specific application deployment software code instance has already been provided and stored in data repository 108 and is available for use.

Referring to the action decision of Table C, orchestrator 110 can monitor the performance metrics parameter value P associated to an existing hosting target computing environment, e.g., CEA in the described example.

TABLE C

| Row | Performance Metrics parameter value for CEA (current target computing environment) | Action Decision |
|---|---|---|
| 1 | TA < P | Refrain from generating semantic tree data structure associated to CEA application deployment software code |
| 2 | TA >= P > TB | Responsively to the condition being satisfied, generate semantic tree data structure associated to CEA application deployment software code, and compose CEB specific application deployment software code for the application, but refrain from sending the newly composed CEB specific application deployment software code to CEB for deployment of the application on CEB. |
| 3 | P < TB | Responsively to the condition being satisfied, send the newly composed CEB specific application deployment software code to CEB for deployment of the application on CEB. |

Referring to Row 1 of Table C, orchestrator 110 can be monitoring performance of the current hosting computing environment CEA and on the determination that the performance metrics parameter value P for CEA remains above the threshold TA can refrain from taking any action in regard to the generation of a computing environment specific tree data structure or the composing of a next hosting computing environment specific application deployment software code instance. Referring to Row 2 of the decision Table C, orchestrator 110 on the determination that the performance metrics parameter value P has fallen below the first threshold can, on the anticipation that the current hosting computing environment CEA may become unsuitable for hosting in the near future, take the anticipatory responsive action of generating a computing environment agnostic semantic tree data structure and generating computing environment specific application software deployment code instance for the next hosting computing environment. However, according to the action decision of Row 2, orchestrator 110, in spite of generating the requisite computing environment agnostic semantic tree data structure and computing environment specific application deployment software code instance, can refrain from sending the newly composed application deployment software code instance to computing environment CEB for deployment until the condition of Row 3 is satisfied. Referring to Row 3, on the determination that the performance metrics parameter value P associated with the hosting current hosting computing environment CEA has fallen below the threshold TB, orchestrator 110 can send the newly composed application deployment software code instance to computing environment CEB so that the application is hosted on the computing environment. Operating under the control of decision Table C, orchestrator 110 can conserve computing resources and can expedite processing by refraining from generating a semantic tree data structure and a second computing environment application deployment software code instance unless the performance metrics parameter value associated to the second computing environment indicates that the second computing environment is approaching but has not yet obtained performance characteristics that renders it suitable for hosting. When an action decision (Row 3) is returned to re-host, the re-hosting can be expedited given that the computing environment specific application code instance for performance of the re-hosting has already been composed and is ready for use (Row 2). In the embodiment of Table C, orchestrator 110 times the composing the second computing environment specific application deployment software code instance responsively to the determining that a re-hosting condition may become satisfied in the near future so that when a re-hosting condition is satisfied, the second computing environment specific application deployment software code instance has already been provided and stored in data repository 108 and is available for use.

The performance metric parameter value P referred to in Table B and Table C can be, e.g., a security performance metric parameter value, a latency performance metric parameter value, or an availability performance metric parameter value.

Further aspects of system 100 are described in reference to FIGS. 5-11. In the schematic view of FIG. 5, it is seen that a pattern mediator defined by orchestrator 110 can be in communication with multiple computing environments, e.g., computing environments CEA, CEB, and CEC. The different computing environments can be cloud-based computing environments, public or private. The described pattern mediator can be responsible for parsing application deployment software code for deployment of an application on a first computing environment to generate an application deployment semantic tree data structure and using the application deployment semantic tree data structure to compose software code for deployment of the application on a second computing environment.

Figure 6:
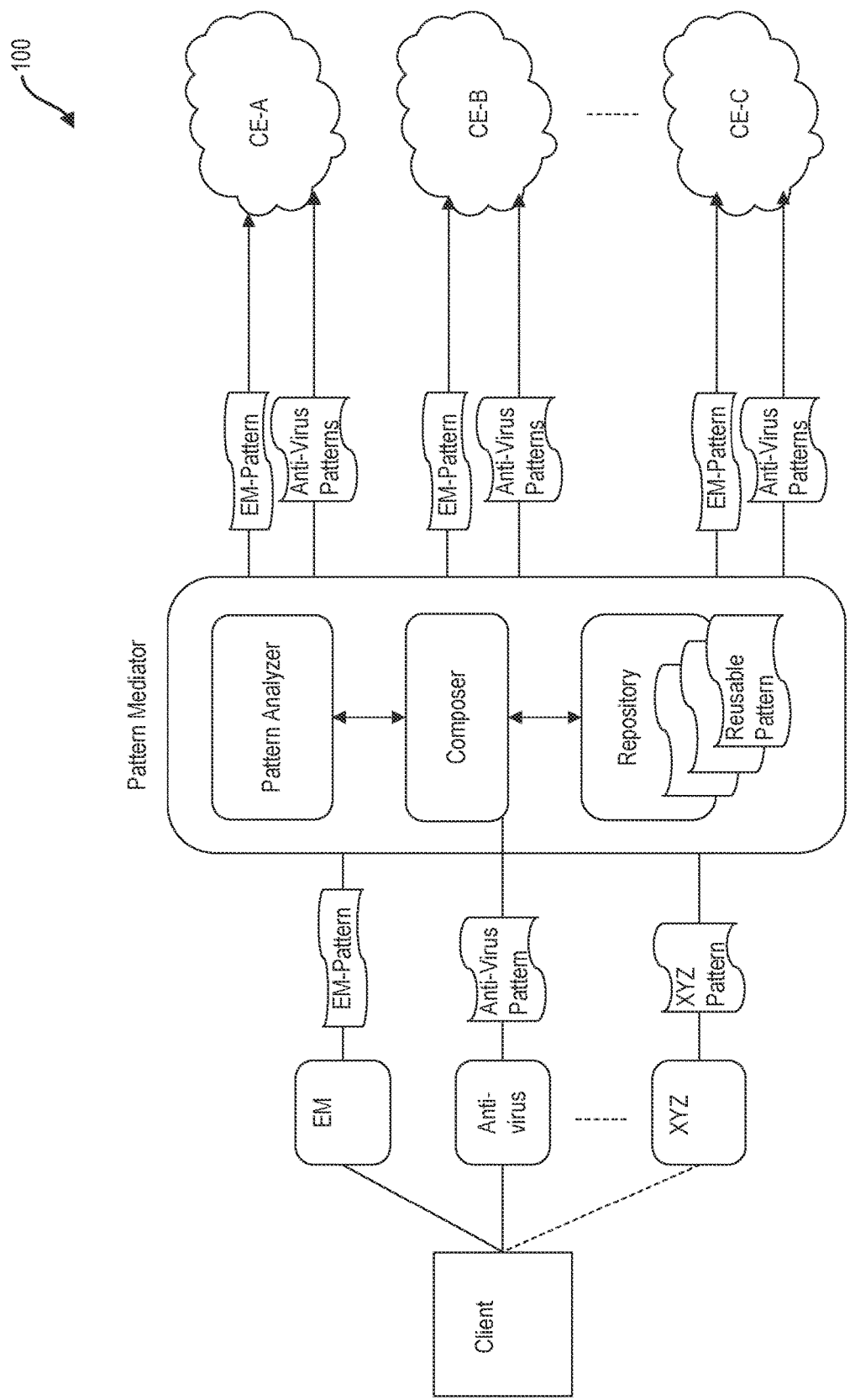
FIG. 6 depicts a system having a pattern mediator according to one embodiment.

Further details of the described pattern mediator are described with reference to FIG. 6 illustrating another schematic view of system 100. Referring to the schematic view of FIG. 6, a pattern mediator defined by orchestrator 110 can parse application deployment software code for deployment of an application wherein a workflow pattern for deployment of the application includes deployment of multiple assets. According to an application workflow pattern for deployment of multiple assets, an application deployment workflow pattern can include asset deployment workflow patterns for deploying multiple assets, e.g., an event monitoring (EM) asset defining an agent, an antivirus asset defining a tool, and an arbitrary asset (labeled ABC) defining a tool. The pattern mediator defined by orchestrator 110 described in reference to FIG. 6 can include a pattern analyzer defined by parsing process 111 (FIG. 1). The pattern analyzer defined by parsing process 111 can parse application deployment software code for deploying an application for generation of an application tree data structure that specifies and represents operation of multiple asset deployment workflow patterns. The pattern analyzer can use code attributes identified by parsing to generate an application deployment tree data structure that includes multiple asset deployment tree data structures, each specifying operations of the asset deployment workflow. The asset deployment semantic tree data structures can specify operations and asset deployment workflow pattern.

Figure 7:
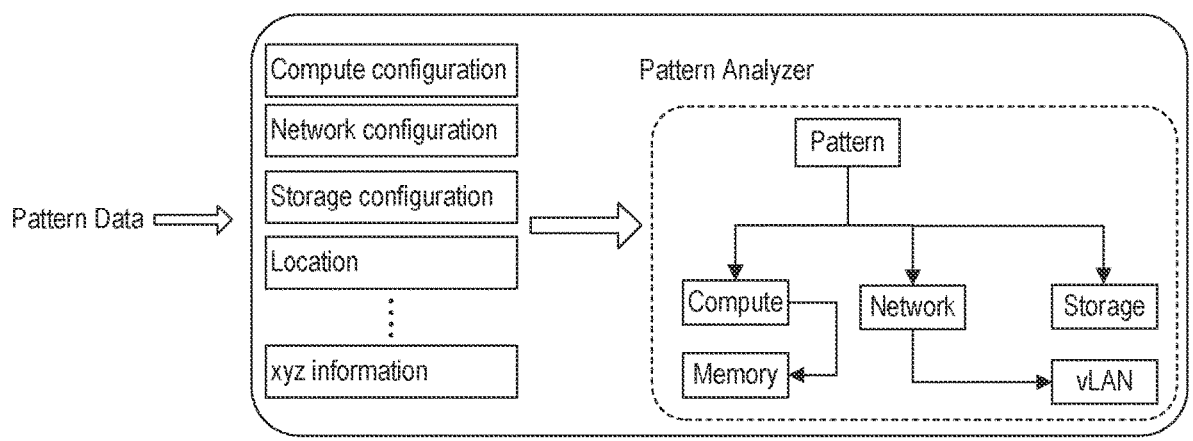
FIG. 7 depicts a pattern analyzer according to one embodiment.

FIG. 7 depicts operations of a pattern analyzer defined by parsing process 111 (FIG. 1). Input pattern data defined by application deployment software code can be input into the pattern analyzer defined by parsing process 111 having tokenizing process 111A and tree generating process 111B. The pattern analyzer defined by parsing process 111 can parse the input application deployment software code to identify attributes therein, e.g., tokens such as tokens of a variety of classifications which can include, e.g., identifiers, keywords, separators, operators, literals, comments, actions, entities, values, and orders of operation. From the identified attributes, the pattern analyzer by tree generating process 111B can generate an application deployment semantic tree data structure that specifies operations of an application deployment workflow pattern.

Figure 8:
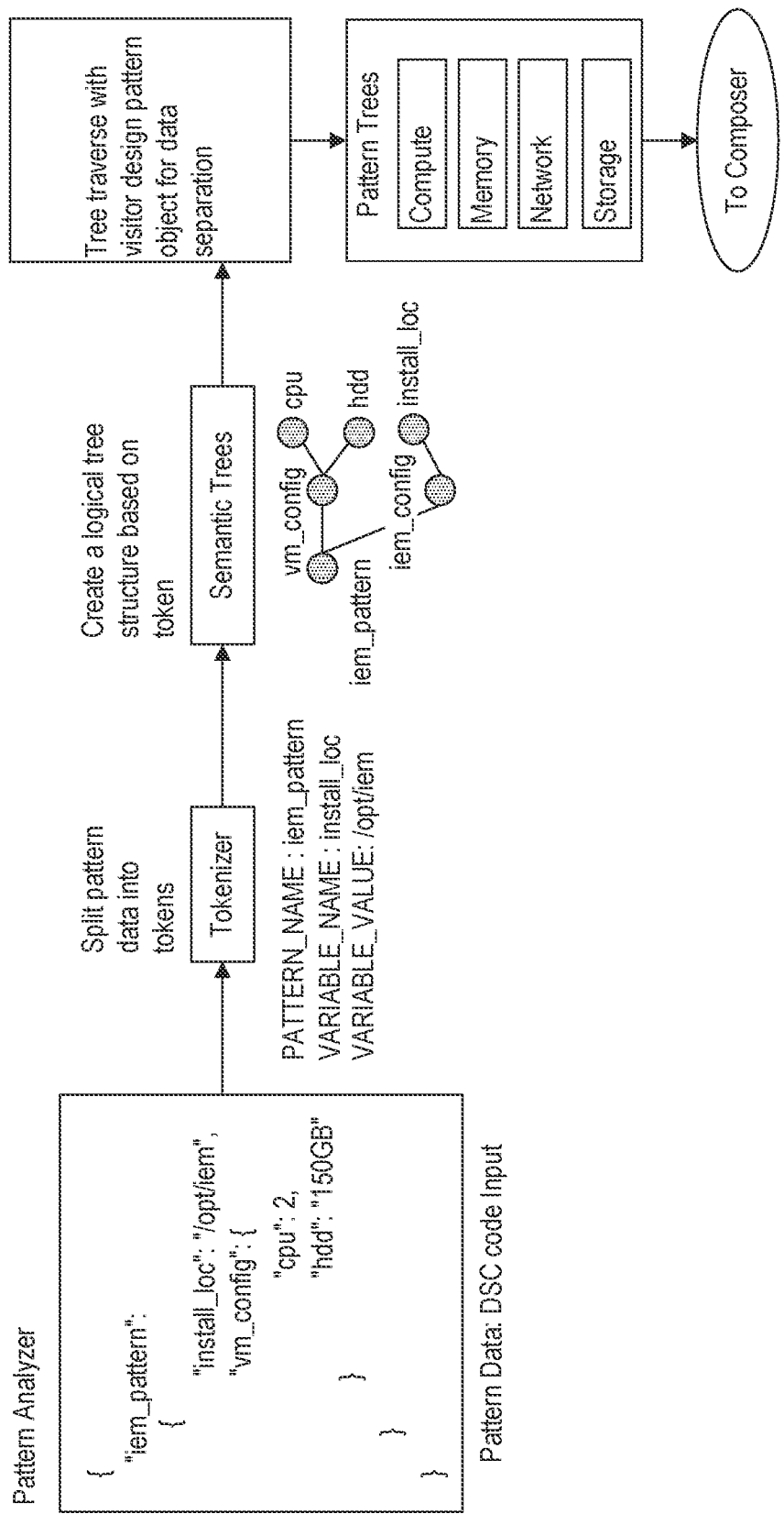
FIG. 8 depicts a pattern analyzer according to one embodiment.

FIG. 8 is a schematic diagram illustrating operations of the described pattern analyzer defined by parsing process 111. The pattern analyzer can take input data in the form of pattern data defined by application deployment software code and can subject the input pattern data to parsing. The parsing can include tokenizing by tokenizer process 111A and tree generating by tree generating process 111B. The parsing can be performed with use of a visitor design pattern for code data separation. The pattern analyzer can produce an application deployment tree data structure that includes one or more computing environment agnostic asset deployment tree data structure that specifies operation of one or more asset deployment workflow. An asset deployment operation tree data structure can include a VM deployment tree data structure that specifies operations of a VM deployment workflow pattern. An asset deployment tree data structure can additionally or alternatively specify operations of an agent or tool asset deployment workflow pattern. The generated application deployment tree data structure can be used by a composer defined by composing process 112 that uses the generated application deployment semantic tree data structure to compose a computing environment specific application software code instance for deployment of the application of the application deployment software code instance on a second computing environment.

Figure 9:
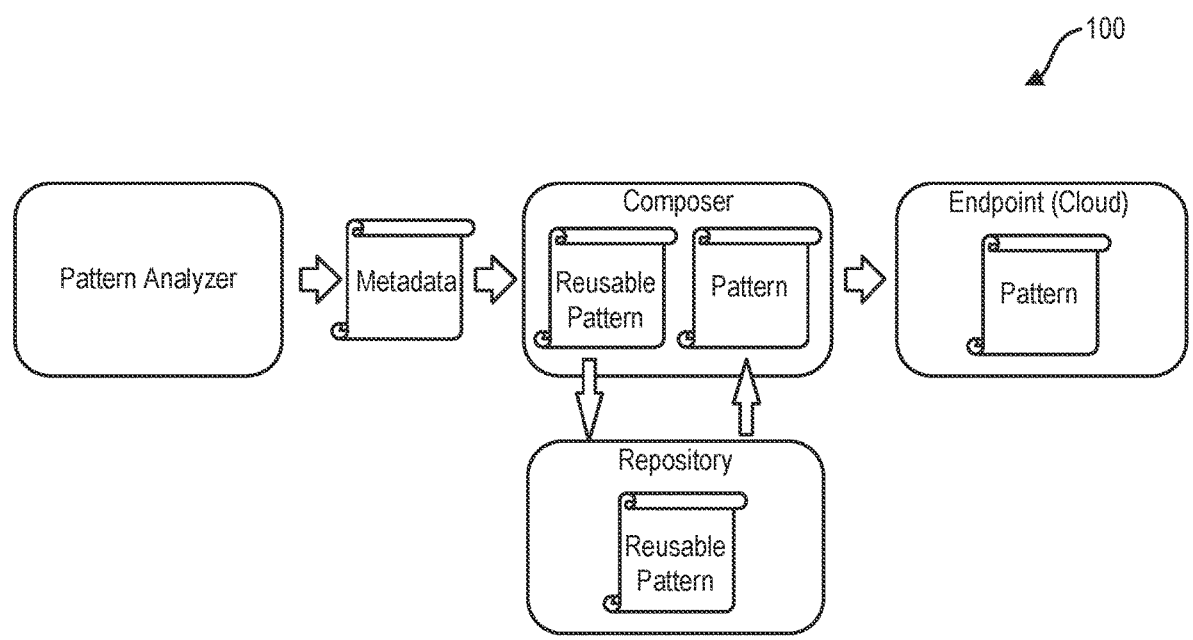
FIG. 9 depicts a system having a pattern analyzer and a composer according to one embodiment.

FIG. 9 illustrates another schematic view of system 100. Referring to the schematic view of system 100 as shown in FIG. 9, a pattern analyzer can parse an input computing environment domain specific application deployment software code instance for generation of metadata. The metadata can be defined by a set of attributes, e.g., tokens produced by a tokenizer, which attributes can be used to generate a computing environment agnostic application deployment tree data structure defining a reusable pattern. The computing environment agnostic reusable pattern, in turn, can be used to compose a computing environment specific instance of application deployment software code. The application deployment semantic tree data structure can be stored in data repository 108 for later use in generating computing environment specific application deployment code instances for use in deployment of the application on a second computing environment.

Figure 10:
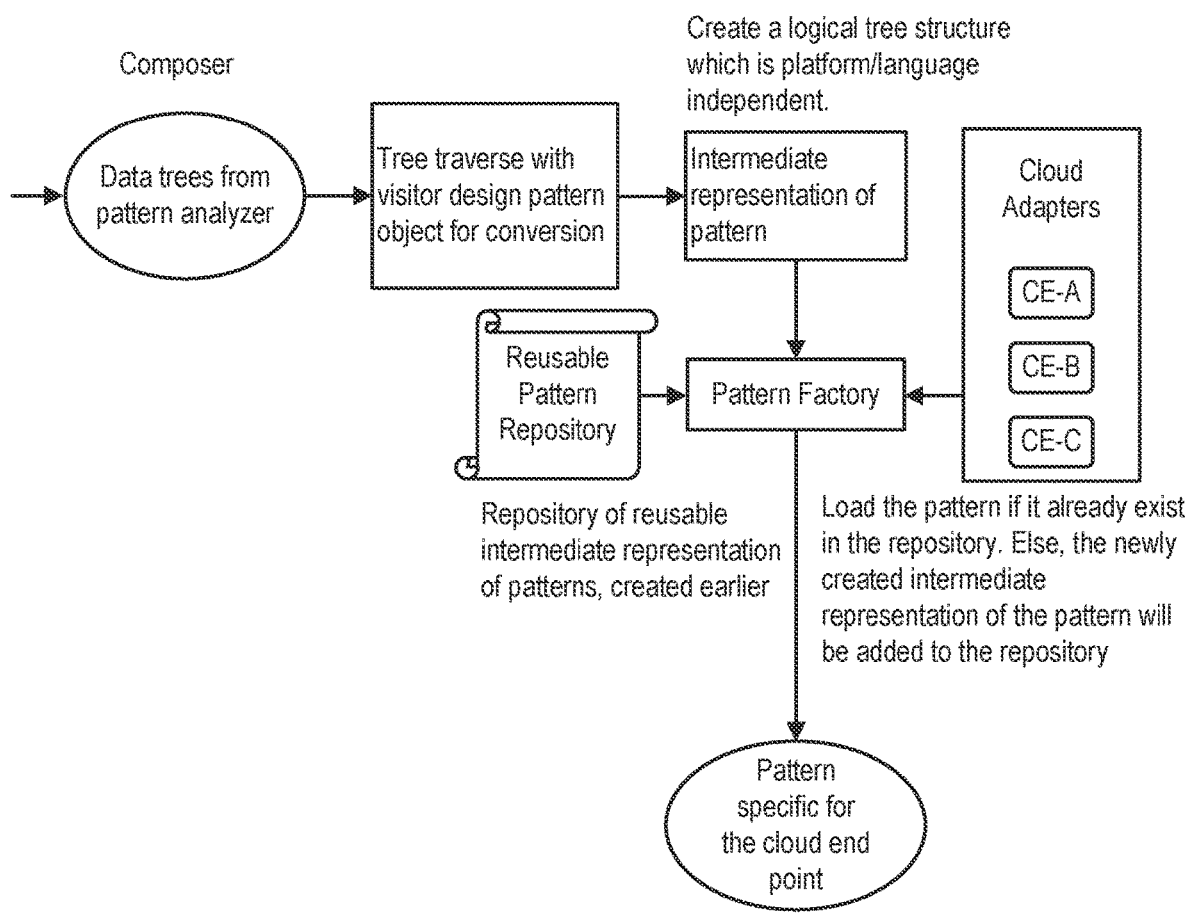
FIG. 10 depicts a composer according to one embodiment.

FIG. 10 is a schematic diagram illustrating operations of the pattern mediator defined by orchestrator 110 (FIG. 1). The schematic view of FIG. 10 illustrates that orchestrator 110, when parsing input application deployment software code, can ascertain whether data repository 108 includes previously stored asset deployment tree data structures associated to asset deployments referenced within the input application software code. On the determination that an asset deployment tree data structure previously generated is stored in data repository 108, orchestrator 110 can reference for access to the previously generated asset deployment tree data structure and combine it for use in a current application deployment tree data structure rather than generate the asset deployment tree data structure. Orchestrator 110, therefore, can avoid regeneration of the previously generated and stored asset deployment tree data structure, thus conserving processing and memory processing resources and expediting processing time.

Figure 11:
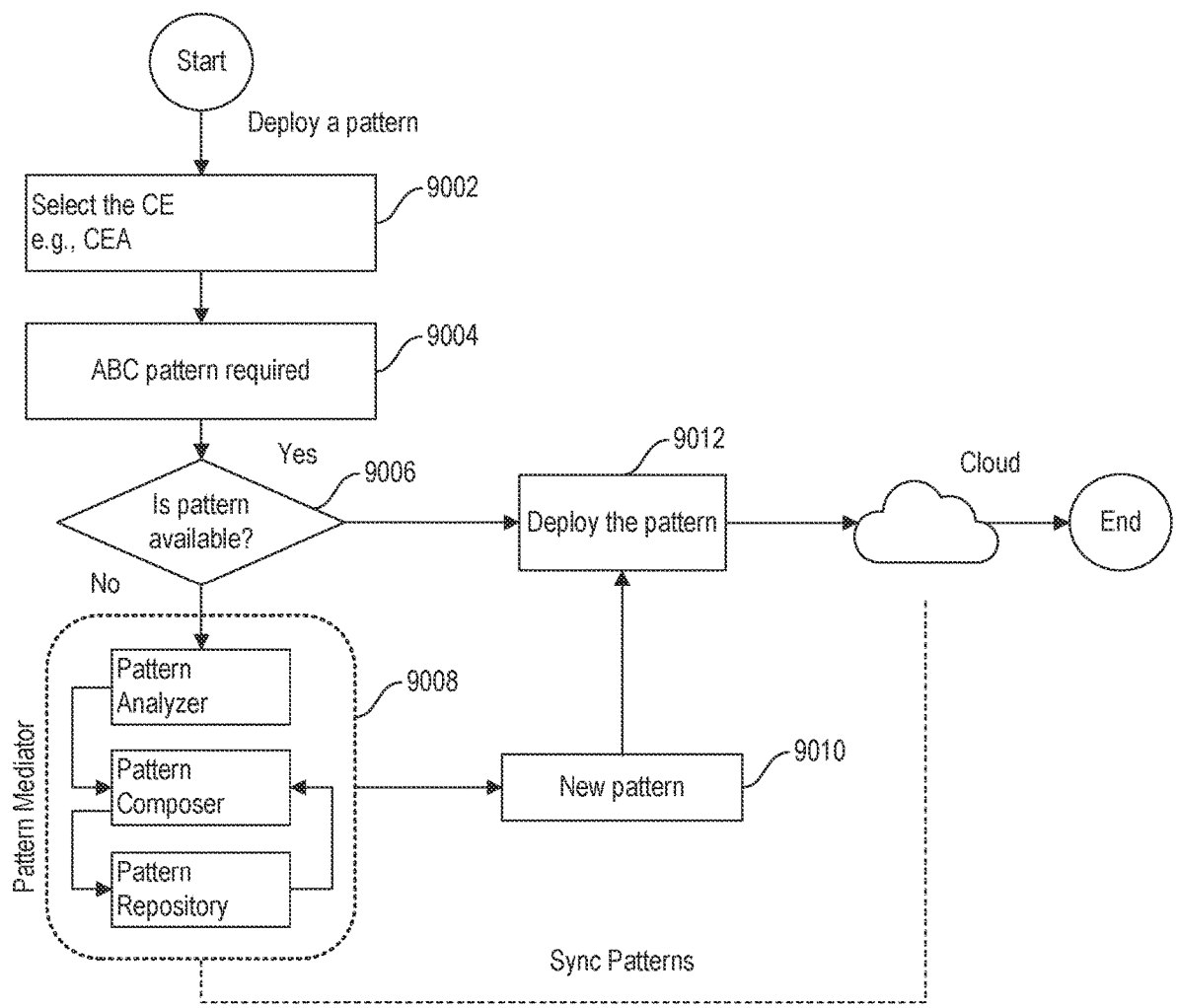
FIG. 11 depicts a method for performance by an orchestrator according to one embodiment.

The flowchart of FIG. 11 illustrates a method for performance by orchestrator 110 for on-demand generation of application deployment software code for deploying an asset within a computing environment. In connection with the flowchart of FIG. 11, deployment of the arbitrary asset ABC is described. A method for performance by orchestrator 110 is described in reference to the flowchart of FIG. 11 in reference to blocks 9002 to 9012 in the flowchart of FIG. 11. At blocks 9002 and 9004, orchestrator 110 can return an action decision to deploy the arbitrary asset ABC on computing environment CEA. At block 9006, orchestrator 110 can examine registry 2121 (FIG. 1) of data repository 108 as depicted in Table A to ascertain whether asset deployment software code for deploying the asset ABC on computing environment CEA is specified within code registry 2122. On the determination that such code is not available within code area 2122, orchestrator 110 can proceed to block 9008. At block 9008, orchestrator 110 can identify within registry 2121 and or code area 2122 an identifier for prior stored asset deployment software code having the appropriate workflow pattern identifier for deploying the arbitrary asset ABC. For such identification, orchestrator 110 can examine software code instance field data having the appropriate identifier that specifies the workflow pattern for deploying the arbitrary asset ABC. For example, with reference to Table A, orchestrator 110 can ascertain that Row 10 lists the pattern X45 for deployment of the arbitrary asset ABC in the domain CEC indicating the asset deployment software code for deployment of the asset ABC is stored within data repository 108. On the determination that such prior stored asset deployment software code exists, and that there is no computing environment domain agnostic asset deployment tree data structure specifying workflow pattern operations for deployment of the asset, orchestrator 110 by the described pattern analyzer can parse the previously stored asset deployment software code instance for identification of attributes therein and can use the identified attributes for the generation of an asset deployment tree data structure specifying operations of the workflow pattern for deployment of the asset ABC. On the generation of the described tree data structure, orchestrator 110 can update the "tree" column of Row 10 to "YES" indicating the generation and storage of the semantic tree data structure.

Orchestrator 110, by the described pattern composer, can compose a new asset deployment software code using a generated semantic tree data structure associated to asset ABC for generating new asset deployment software code for deploying the asset ABC on the computing environment CEA. The described operations of the pattern composer can include data query steps to acquire data from data repository 108 and can also include storing returned software code instances and semantic tree data structures into data repository 108. Orchestrator 110 can generate the new asset deployment software code instance as indicated by block 9010 and can send the asset deployment software code to computing environment CEA for deployment of the pattern at block 9012.

Embodiments herein recognize that enterprises can follow a standard process for provisioning and de-provisioning of the enterprise's IT assets in a hybrid multicloud environment and often these are encapsulated as a pattern.

A pattern herein, in one embodiment, can refer to a repeatable piece of automation that defines an application or application component deployed on computing environment infrastructure to build and configure a standard solution. This is one of the building blocks in a cloud deployment model for bringing up the infrastructure. Patterns can help enterprises in terms of repeatability and also brings in consistency and reliability saving several hours of labor and dollars for the clients. With enterprises having a large ecosystem of system management, monitoring, security, and compliance requirements often result in the patterns getting complex over a period of time and thus prone to automation errors. Embodiments herein recognize that in today's multicloud world, customer workloads can be spread across public and private cloud computing environments and that many customers prefer a hybrid cloud computing environment solution wherein resources/service can be provisioned across public and private cloud computing environments.

Embodiments herein recognize that in a multicloud computing environment system, each cloud platform can follow a different methodology and language for its Infrastructure As Code (IAC) style of deployment. Accordingly, a plethora of patterns might be defined, even though the end goal is the same.

Figure 5:
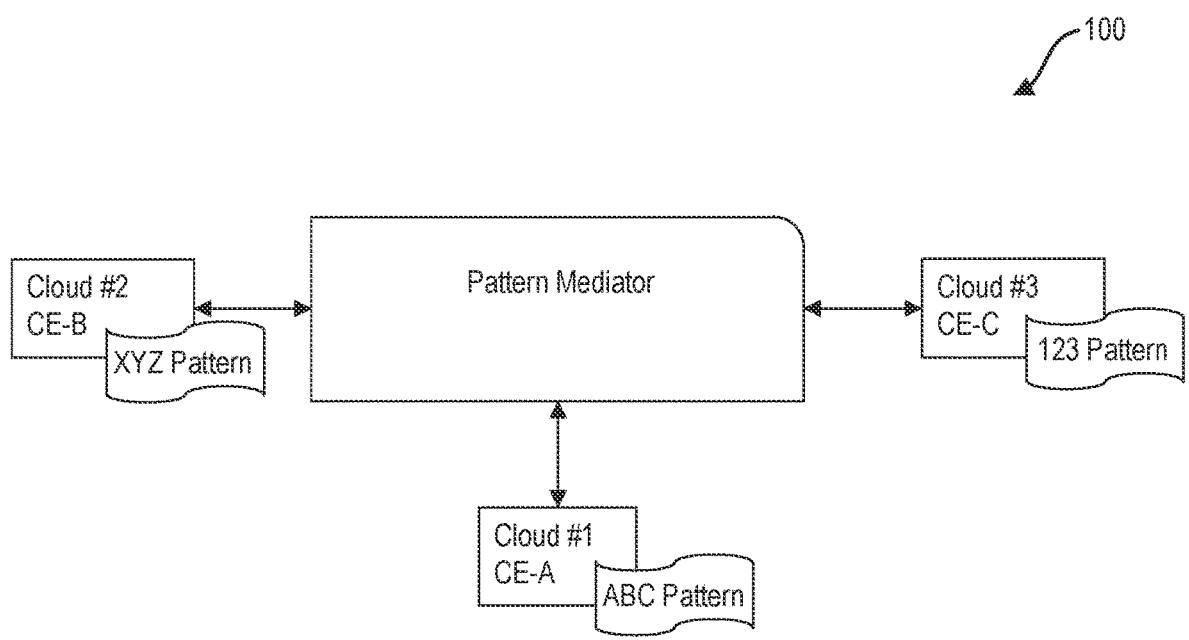
FIG. 5 depicts a system having a pattern mediator according to one embodiment.

In one exemplary use case as depicted in FIG. 5, a user (client) may return an action decision to install an application that includes (1) an Event Management (EM) agent, (2) an antivirus product, or (3) a generic product XYZ onto three Virtual Machines (VMs) spanning across computing environments CEA, CEB, and CEC. Embodiments herein recognize that the IAC deployment software code instances for these target platforms can vary at least in terms of, e.g., protocol and connection credentials used for connection establishment, lifecycle calls for execution completion, and programming technology used.

Embodiments herein recognize that in the scenario shown in FIG. 5, according to a current approach, separate IAC deployment software code instances must be written for each agent and for each target platform. Embodiments herein recognize that more generically, when the client has N number of different patterns targeted for M number of cloud platforms (endpoints), they will end up writing N*M number of application deployment software code instances which presents maintenance complications.

Embodiments herein recognize that different computing environments have their own format of patterns which can preclude use on other computing environments. Embodiments herein recognize that developing an automation pattern for a specific computing environment requires domain knowledge and specific development skills. Embodiments also recognize that converting one format of pattern into another format can require more human effort and manual coding processes than developing a new one.

Embodiments herein can provide a pattern mediator as shown in FIG. 6 which can act as a bridge between computing environments which can define a hybrid cloud system. This mediator can be understanding the various technologies, e.g., protocols, lifecycles, and programming technology in the realm of Infrastructure As Code (IAC), including in their differentiated aspects across the computing environments.

Referring to FIG. 7, the pattern analyzer can provide patterns for use in different clouds and can obtain data references from each of the respective clouds. The pattern analyzer can have references to patterns from respective clouds, and it can be analyzing permutation and combinations and can be providing the format of respective domain specific patterns in the form of reusable domain agnostic pattern.

A pattern analyzer can perform parsing which can include tokenizing and tree generating. Tokenizing can include breaking a deployment software code instance into smaller elements for easy translation from one format to another.

A composer can be composing domain specific patterns defined by deployment software code instances as per the outcome from a pattern analyzer. A composer can convert a reusable pattern provided by a semantic tree data structure into respective domain specific patterns for deployment of an application.

There is set forth herein, in one embodiment, a method and apparatus to create a pattern to make it execute uniformly in various public or private cloud instances in a cloud platform agnostic way. A pattern mediator herein, defined by orchestrator 110, can include a pattern analyzer and a pattern composer.

Embodiments herein recognize that when a version of an application changes, cost will accrue for rework and developments. Embodiments herein can reduce cost associated with the reworks and developments associated to a version upgrade. Embodiments herein can facilitate rapid deployment of a common application across multiple computing environments. An upgrade can be rapidly implemented with respect to an application running on a first to Kth computing environment. An upgrade can be developed for a domain specific instance of the application running on a first computing environment of the first through Kth computing environments, and an upgraded domain specific application deployment software code instance can be deployed on a first computing environment. The pattern mediator can be used to examine the domain specific deployment code instance to derive a domain agnostic application deployment semantic tree data structure specifying operations of an application deployment workflow pattern. The pattern mediator can then use the domain agnostic application deployment semantic tree data structure for composing domain specific deployment code instances of the application for the second to Kth computing environments. Embodiments herein can ensure the continuous improvement across the computing environments automatically.

Embodiments herein can reduce the development cost and can speed up deployments. With use of embodiments herein, a computing environment domain specific deployment code instance can define a reusable code instance usable on any computing environment by running of a parser to generate a semantic tree data structure specifying domain agnostic operations defining a workflow pattern of a deployment, and then using the semantic tree data structure for composing a second computing environment deployment software code instance. According to embodiments herein, reusable codes are available to deploy on any computing environment, which can speed up deployments. Embodiments herein can remove vendor dependency. In current multicloud scenarios, developing patterns can require vendor support due to the skills or technical limitations. Embodiments herein can remove the vendor intervention from a development perspective.

Embodiments herein can convert a first computing environment domain specific deployment software code instance into a domain agnostic pattern defined by a semantic tree data structure and compose a second computing environment domain specific deployment code instance specific to any second domain using the semantic tree data structure to make the first computing environment domain specific deployment software code instance uniformly executable in a cloud agnostic way. Embodiments herein can facilitate use of the same pattern for all computing environments.

Embodiments herein provide a method and apparatus to create a platform agnostic IAC pattern to make it executable uniformly in various public or private cloud instances by combining (a) a pattern analyzer which provides a domain agnostic semantic tree data structure specifying a software deployment workflow pattern, and (b) a pattern composer which uses the tree data structure to compose a domain specific deployment software code instance.

Embodiments herein can provide a Pattern Mediator, which can generate platform agnostic deployment software code instances for Infrastructure As Code (IAC) deployments dynamically.

Embodiments herein can facilitate IAC deployments. The input to the pattern mediator of FIG. 6, according to one embodiment, can be code in text format specific to a first computing environment domain, and the output can also be code in another format specific to a second computing environment domain. The second computing environment can be any selected computing environment. The selected computing environment can be manually or automatically selected.

Certain embodiments herein may offer various technical computing advantages and practical applications to address problems arising in the realm of computer systems. Embodiments herein can include features to promote automated deployment of software applications on multiple computing environments with improved installation and deployment speed and in some embodiments without manual re-coding by a developer user. Embodiments herein recognize that deployment of a certain application on multiple computing environments has historically included manual re-coding of software application software code for deployment after an initial after development of an initial application deployment software code instance on a computing environment defining an initial target computing environment. Embodiments herein can include parsing of an application deployment software code instance for installation of the software application. The parsing can include parsing to identify attributes of the application deployment software code instance, including, e.g., identifiers, keywords, separators, operators, literals, comments, actions, entities, values and orders of operation. Embodiments herein can use results of the parsing of an application deployment software code instance for conversion of application deployment software code instance into a computing environment agnostic semantic tree data structure which can include nodes and edges. The nodes of the computing environment agnostic semantic tree data structure can be associated to actions and entities, and edges between nodes can represent orders of operation for deployment of the certain application. An orchestrator can use the provided semantic tree data structure for composing a second application deployment software code instance associated to the second target computing environment for deployment of the certain application on a second computing environment. The composed software code can be installed on the second target computing environment for deployment of the certain application on the second target computing environment. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing.

Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 12:
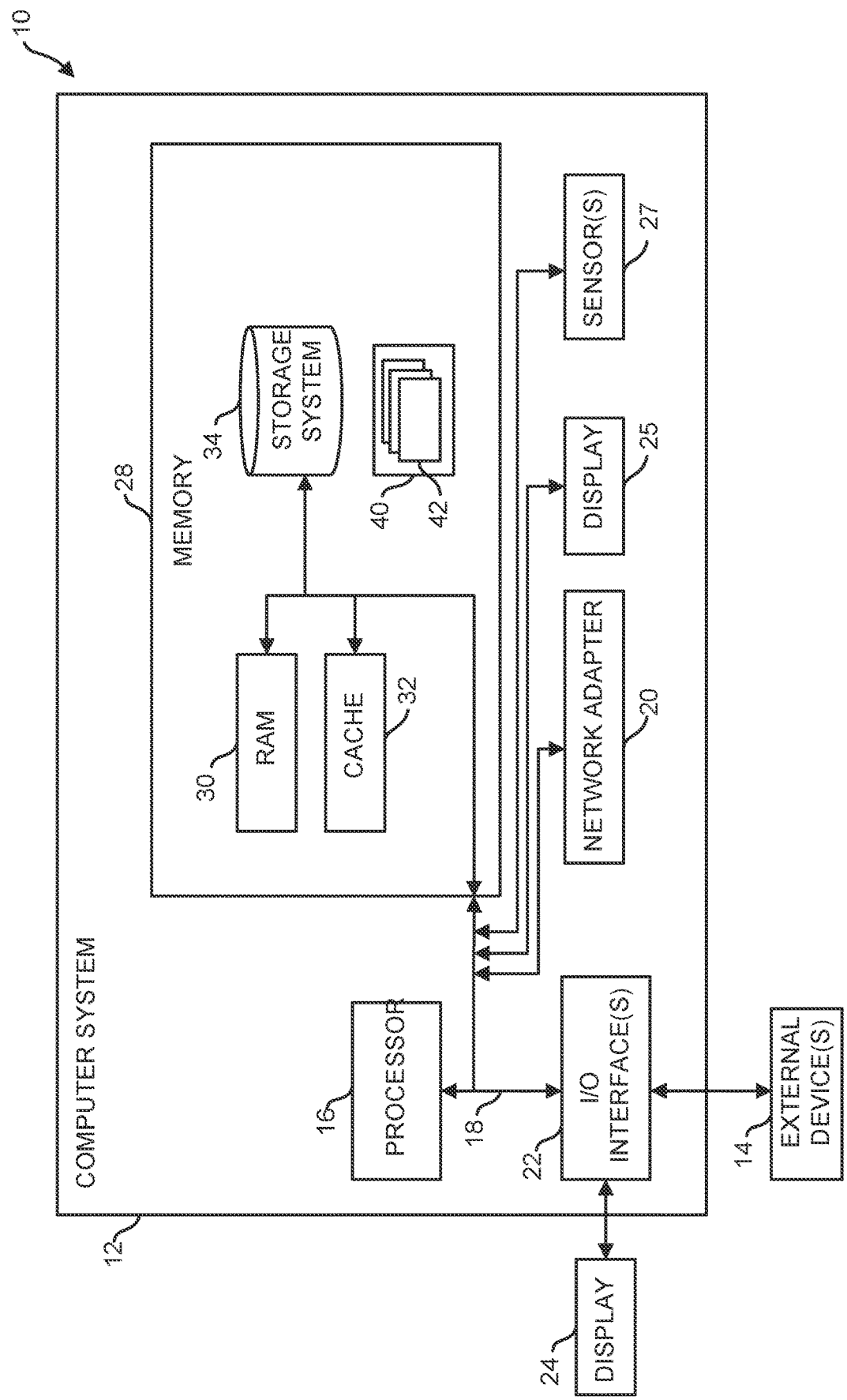
FIG. 12 depicts a computing node according to one embodiment.
Figure 13:
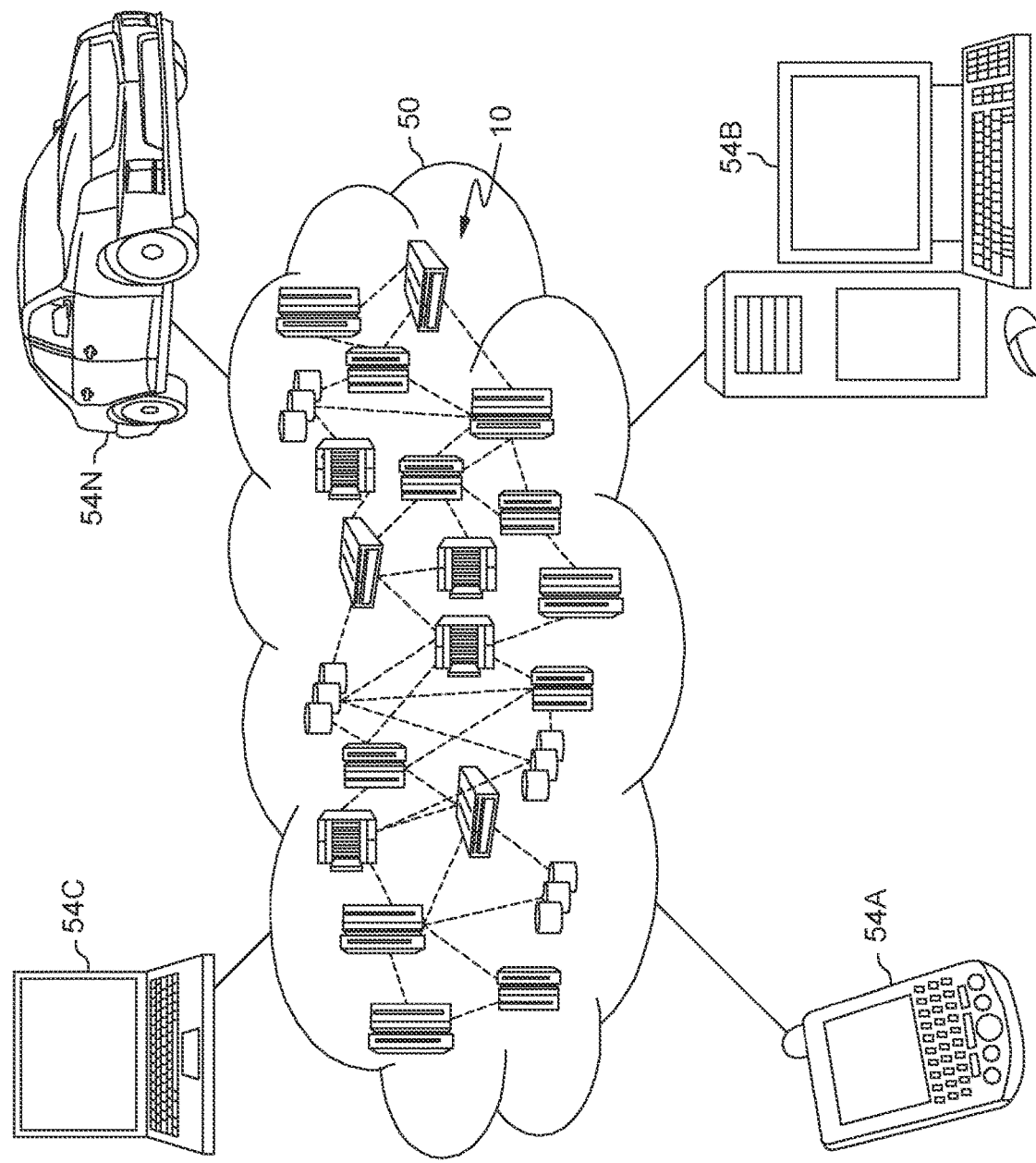
FIG. 13 depicts a cloud computing environment according to one embodiment.
Figure 14:
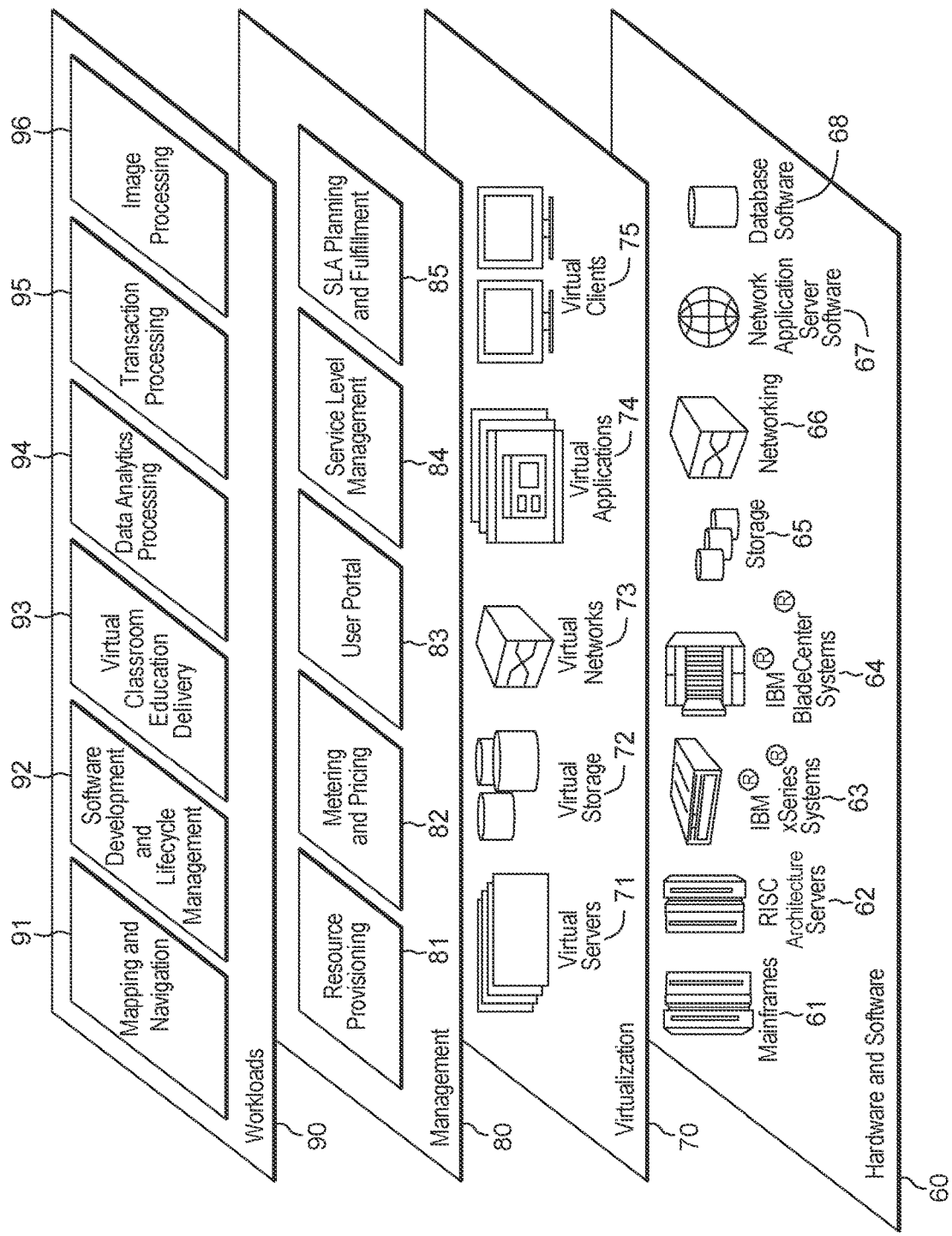
FIG. 14 depicts abstraction model layers according to one embodiment.

FIGS. 12-14 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 12-14, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, orchestrator 110 can include one or more computing node 10 and can include one or more program 40 for performing functions described with reference to orchestrator 110 as set forth in the flowchart of FIG. 2, as well as the functions of orchestrator 110 described with reference to FIGS. 4, 5-11. In one embodiment, computing environments 140A-140Z can include one or more computing node 10 and can include one or more program 40 for performing functions described with reference to one or more computing environments 140A-140Z as set forth in the flowchart of FIG. 2 as well as described in remaining diagrams. In one embodiment, one or more UE device 120A-120Z can include one or more computing node 10 and can include one or more program 40 for performing functions described with reference to one or more UE device 120A as set forth in the flowchart of FIG. 2 as well as described in remaining diagrams. In one embodiment, the computing node based systems and devices depicted in FIG. 1 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 13 computing node 10 is described as being implemented in a cloud computing environment and accordingly is referred to as a cloud computing node in the context of FIG. 13.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for application and asset deployment as set forth herein. The processing components 96 can be implemented with use of one or more program 40 described in FIG. 12.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining a first computing environment specific application deployment software code instance associated to a first computing environment, the first computing environment specific application deployment software code instance for deployment of a certain application on the first computing environment;
    parsing the first computing environment specific application deployment software code instance, wherein the parsing comprises:
        determining, using a tokenizing process, tokenized attributes of the first computing environment specific application deployment software code instance; and
        generating, using the determined tokenized attributes of the first computing environment specific application deployment software code instance, a computing environment agnostic semantic tree data structure that expresses a workflow pattern for deployment of the certain application based on the tokenized attributes; and
    composing, with use of the computing environment agnostic semantic tree data structure, a second computing environment specific application deployment software code instance associated to a second computing environment for deployment of the certain application on the second computing environment,
    wherein the first computing environment specific application deployment software code instance includes an asset deployment software code instance and a second asset deployment software code instance,
    wherein the generating includes examining a data repository to determine that a computing environment agnostic asset deployment semantic tree data structure has been previously stored for the second asset deployment code instance, and
    wherein the generating includes referencing without re-generating the computing environment agnostic asset deployment semantic tree data structure that has been previously stored for the second asset deployment software code instance.

2. The computer implemented method of claim 1, wherein the method includes monitoring performance of the second computing environment, and migrating the certain application to the second computing environment responsively to the monitoring.

3. The computer implemented method of claim 1, wherein the method includes monitoring performance of the second computing environment, and migrating the certain application to the second computing environment responsively to the monitoring, wherein the migrating includes composing the second computing environment specific application deployment software code instance associated to the second computing environment for deployment of the certain application on the second computing environment.

4. The computer implemented method of claim 1, wherein the determining, using the tokenizing process, comprises determining first attributes of the first computing environment specific application deployment software code instance, wherein the first attributes comprise identifiers, keywords, separators, operators, literals, comments, actions, entities, values and orders of operation, and wherein the first attributes are tokens.

5. The computer implemented method of claim 1, wherein the method includes monitoring performance of the second computing environment, and migrating the certain application to the second computing environment responsively to the monitoring, wherein the migrating includes composing, using the computing environment agnostic semantic tree data structure, the second computing environment specific application deployment software code instance, wherein the monitoring performance includes monitoring CPU usage of the second computing environment.

6. The computer implemented method of claim 1, wherein the method includes monitoring performance of the second computing environment, and migrating the certain application to the second computing environment responsively to the monitoring, wherein the determining, using the tokenizing process, comprises determining first attributes of the first computing environment specific application deployment software code instance, wherein the first attributes comprise identifiers, keywords, separators, operators, literals, comments, actions, entities, values and orders of operation, and wherein the first attributes are tokens.

7. The computer implemented method of claim 1, wherein the method includes monitoring performance of the second computing environment, and performing the composing so that the composing is timed responsively to a determining by the monitoring that a performance condition has been satisfied.

8. The computer implemented method of claim 1, wherein the method includes monitoring performance of the second computing environment, and performing the composing and the generating so that the composing and the generating are timed responsively to a determining by the monitoring that a performance condition has been satisfied.

9. The computer implemented method of claim 1, wherein the method includes monitoring performance of the second computing environment, and performing the composing so that the composing is timed responsively to a determining by the monitoring that a performance condition has been satisfied, wherein the method includes deploying the certain application on the second computing environment, wherein the deploying is timed responsively to a determining by the monitoring that a second performance condition of the second computing environment has been satisfying, the second condition indicating that the second computing environment is suitable for hosting the certain application.

10. A computer program product comprising:
a computer readable storage medium readable by one or more processing circuit and storing instructions for execution by one or more processor for performing a method comprising:
obtaining a first computing environment specific application deployment software code instance associated to a first computing environment, the first computing environment specific application deployment software code instance for deployment of a certain application on the first computing environment;
parsing the first computing environment specific application deployment software code instance, wherein the parsing comprises:
determining, using a tokenizing process, tokenized attributes of the first computing environment specific application deployment software code instance; and
generating, using the determined tokenized attributes of the first computing environment specific application deployment software code instance, a computing environment agnostic semantic tree data structure that expresses a workflow pattern for deployment of the certain application based on the tokenized attributes; and
composing, with use of the computing environment agnostic semantic tree data structure, a second computing environment specific application deployment software code instance associated to a second computing environment for deployment of the certain application on the second computing environment,
wherein the first computing environment specific application deployment software code instance includes an asset deployment software code instance and a second asset deployment software code instance, wherein the generating includes examining a data repository to determine that a computing environment agnostic asset deployment semantic tree data structure has been previously stored for the second asset deployment code instance, and
wherein the generating includes referencing without re-generating the computing environment agnostic asset deployment semantic tree data structure that has been previously stored for the second asset deployment software code instance.

11. The computer program product of claim 10, wherein the method includes monitoring performance of the second computing environment, and migrating the certain application to the second computing environment responsively to the monitoring.

12. The computer program product of claim 10, wherein the method includes monitoring performance of the second computing environment, and migrating the certain application to the second computing environment responsively to the monitoring, wherein the migrating includes composing the second computing environment specific application deployment software code instance associated to the second computing environment for deployment of the certain application on the second computing environment.

13. The computer program product of claim 10, wherein the method includes monitoring performance of the second computing environment, and migrating the certain application to the second computing environment responsively to the monitoring, wherein the migrating includes composing, using the computing environment agnostic semantic tree data structure, the second computing environment specific application deployment software code instance, wherein the monitoring performance includes monitoring CPU usage of the second computing environment.

14. A system comprising:
a memory;
at least one processor in communication with the memory; and
program instructions executable by one or more processor via the memory to perform a method comprising:
obtaining a first computing environment specific application deployment software code instance associated to a first computing environment, the first computing environment specific application deployment software code instance for deployment of a certain application on the first computing environment;
parsing the first computing environment specific application deployment software code instance, wherein the parsing comprises:
determining, using a tokenizing process, tokenized attributes of the first computing environment specific application deployment software code instance; and
generating, using the determined tokenized attributes of the first computing environment specific application deployment software code instance, a computing environment agnostic semantic tree data structure that expresses a workflow pattern for deployment of the certain application based on the tokenized attributes,
wherein the computing environment agnostic semantic tree data structure, in dependence on the determined attributes of the first computing environment specific application deployment software code instance, specifies operations of a virtual machine (VM) deployment workflow pattern; and
composing, with use of the computing environment agnostic semantic tree data structure, a second computing environment specific application deployment software code instance associated to a second computing environment for deployment of the certain application on the second computing environment, wherein the first computing environment specific application deployment software code instance includes an asset deployment software code instance and a second asset deployment software code instance, wherein the generating includes examining a data repository to determine that a computing environment agnostic asset deployment semantic tree data structure has been previously stored for the second asset deployment code instance, and wherein the generating includes referencing without re-generating the computing environment agnostic asset deployment semantic tree data structure that has been previously stored for the second asset deployment software code instance.

15. The system of claim 14, wherein the computing environment agnostic semantic tree data structure includes nodes and edges, and wherein an edge between nodes of the computing environment agnostic semantic tree data structure specifies an order of actions for deployment of the certain application.

16. The system of claim 14, wherein the computing environment agnostic semantic tree data structure, in dependence on the determined attributes of the first computing environment specific application deployment software code instance, specifies operations of an event monitoring agent deployment workflow pattern.

17. The system of claim 14, wherein the computing environment agnostic semantic tree data structure, in dependence on the determined attributes of the first computing environment specific application deployment software code instance, specifies operations of an antivirus tool deployment workflow pattern.

18. The system of claim 14, wherein the computing environment agnostic semantic tree data structure includes nodes and edges, and wherein an edge between nodes of the computing environment agnostic semantic tree data structure specifies an order of actions for deployment of the certain application, wherein the computing environment agnostic semantic tree data structure, in dependence on the determined attributes of the first computing environment specific application deployment software code instance, specifies operations of an event monitoring agent deployment workflow pattern, and wherein the computing environment agnostic semantic tree data structure, in dependence on the determined attributes of the first computing environment specific application deployment software code instance, specifies operations of an antivirus tool deployment workflow pattern.

* * * * *